US012620352B2

(12) United States Patent
Qiu

(10) Patent No.: US 12,620,352 B2
(45) Date of Patent: May 5, 2026

(54) PIXEL CIRCUIT AND DRIVE METHOD THEREFOR, DISPLAY PANEL AND DISPLAY DEVICE

(71) Applicants: Chongqing BOE Display Technology Co., Ltd., Chongqing (CN); BOE Technology Group Co., Ltd., Beijing (CN)

(72) Inventor: Yuanyou Qiu, Beijing (CN)

(73) Assignees: Chongqing BOE Display Technology Co., Ltd., Chongqing (CN); BOE Technology Group Co., Ltd., Beijing (CN)

(*) Notice: Subject to any disclaimer, the term of this patent is extended or adjusted under 35 U.S.C. 154(b) by 86 days.

(21) Appl. No.: 18/022,486

(22) PCT Filed: Apr. 24, 2022

(86) PCT No.: PCT/CN2022/088832
§ 371 (c)(1),
(2) Date: Feb. 21, 2023

(87) PCT Pub. No.: WO2023/205964
PCT Pub. Date: Nov. 2, 2023

(65) Prior Publication Data

US 2024/0265866 A1 Aug. 8, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01);
(Continued)

(58) Field of Classification Search
CPC ......... G09G 3/3233; G09G 2300/0819; G09G 2300/0852; G09G 2300/0861;
(Continued)

(56) References Cited

U.S. PATENT DOCUMENTS

2023/0222978 A1* 7/2023 Yao ...................... G11C 19/287 345/214
2023/0410744 A1* 12/2023 Guo ..................... G09G 3/3283

FOREIGN PATENT DOCUMENTS

CN 107452339 A 12/2017
CN 108389549 A * 8/2018 ........... G09G 3/3225
(Continued)

OTHER PUBLICATIONS

Han et al., Machine Translation of Foreign Patent Document CN 110570813AA, Pixel circuit, driving method and display panel, Dec. 13, 2019, pp. 1-29 (Year: 2019).*
(Continued)

*Primary Examiner* — Amr A Awad
*Assistant Examiner* — Maheen I Javed
(74) *Attorney, Agent, or Firm* — IPro, PLLC

(57) ABSTRACT

Provided are a pixel circuit and a drive method therefor, a display panel and a display device. The pixel circuit includes: a light emitting device; a drive transistor configured to generate, according to a data voltage, a drive current for driving the light emitting device to emit light; a data writing circuit coupled to the drive transistor, where the data writing circuit is configured to input the data voltage in response to a signal applied to the data writing circuit; and a voltage control circuit coupled to the drive transistor, where the voltage control circuit is configured to reset a control electrode, a first electrode and a second electrode of the drive transistor in response to a signal applied to the voltage control circuit before the data voltage is input.

13 Claims, 24 Drawing Sheets

(52) U.S. Cl.
CPC ............... *G09G 2300/0861* (2013.01); *G09G 2310/0286* (2013.01); *G09G 2310/08* (2013.01); *G09G 2320/0257* (2013.01)

(58) Field of Classification Search
CPC ....... G09G 2310/0286; G09G 2310/08; G09G 2320/0257
See application file for complete search history.

(56) References Cited

FOREIGN PATENT DOCUMENTS

| | | | | | |
|---|---|---|---|---|---|
| CN | 109285500 | A | | 1/2019 | |
| CN | 109559686 | A | | 4/2019 | |
| CN | 110544458 | A | | 12/2019 | |
| CN | 110570813 | A | * | 12/2019 | ........... G09G 3/3225 |
| CN | 111710298 | A | | 9/2020 | |
| CN | 112435629 | A | | 3/2021 | |
| CN | 112435630 | A | | 3/2021 | |
| CN | 113112955 | A | | 7/2021 | |
| CN | 109658870 | B | | 11/2021 | |
| CN | 113838419 | A | | 12/2021 | |
| CN | 113870758 | A | | 12/2021 | |
| CN | 113870789 | A | | 12/2021 | |

OTHER PUBLICATIONS

Fu et al., Machine Translation of Foreign Patent Document CN 108389549A, Pixel circuit, driving method of pixel circuit, display panel, and driving method of display panel, Aug. 10, 2018, pp. 1-37 (Year: 2018).*

Fu Jujian, Machine Translation of Foreign Patent Document CN 108389549A, Pixel circuit, driving method of pixel circuit, display panel, and driving method of display panel, Aug. 10, 2018, pp. 1-.36 (Year: 2018).*

CN 202280000857.6 first office actin dated Jun. 5, 2025.

* cited by examiner

PIXEL CIRCUIT AND DRIVE METHOD THEREFOR, DISPLAY PANEL AND DISPLAY DEVICE

CROSS REFERENCE TO RELATED APPLICATIONS

This application is a national phase entry under 35 U.S.C. § 371 of International Application No. PCT/CN2022/088832, filed on Apr. 24, 2022, the entire content of which is incorporated herein by reference.

FIELD

The disclosure relates to the field of display technology, and particularly to a pixel circuit and a drive method therefor, a display panel and a display device.

BACKGROUND

With advantages of self-illumination and low energy consumption, electroluminescent diodes such as an organic light emitting diode (OLED), a quantum dot light emitting diode (QLED) and a micro light emitting diode (Micro LED) have become a focus of application and research of electroluminescent display devices at present. Generally, pixel circuits are used in the electroluminescent display devices to drive the electroluminescent diodes to emit light.

SUMMARY

An embodiment of the disclosure provides a pixel circuit. The pixel circuit includes: a light emitting device, a drive transistor configured to generate, according to a data voltage, a drive current for driving the light emitting device to emit light, a data writing circuit coupled to the drive transistor, the data writing circuit being configured to input the data voltage by a data writing circuit in response to a signal applied to the data writing circuit, and a voltage control circuit coupled to the drive transistor, where the voltage control circuit is configured to reset a control electrode, a first electrode and a second electrode of the drive transistor in response to a signal applied to the voltage control circuit, before the data voltage is input.

In some examples, the voltage control circuit is further configured to: in response to a first control signal applied to a first control signal terminal, provide a first initialization signal applied to a first initialization signal terminal to the control electrode of the drive transistor, so as to reset the control electrode of the drive transistor; and in response to a second control signal applied to a second control signal terminal, reset the first electrode and the second electrode of the drive transistor.

In some examples, the voltage control circuit includes a first transistor, a second transistor and a storage capacitor. A control electrode of the first transistor is coupled to the first control signal terminal, a first electrode of the first transistor is coupled to the first initialization signal terminal, and a second electrode of the first transistor is coupled to the control electrode of the drive transistor. A control electrode of the second transistor is coupled to the second control signal terminal, a first electrode of the second transistor is coupled to the control electrode of the drive transistor, and a second electrode of the second transistor is coupled to the second electrode of the drive transistor. A first electrode of the storage capacitor is coupled to the control electrode of the drive transistor, and a second electrode of the storage capacitor is coupled to the first electrode of the drive transistor.

In some examples, the voltage control circuit is further configured to, while the data voltage is input, compensate a threshold voltage of the drive transistor in response to the second control signal applied to the second control signal terminal.

In some examples, the pixel circuit further includes a threshold compensation circuit. The threshold compensation circuit is coupled to the drive transistor, and the threshold compensation circuit is configured to: while the data voltage is input, compensate the threshold voltage of the drive transistor in response to a third control signal applied to a third control signal terminal.

In some examples, the threshold compensation circuit includes a third transistor. A control electrode of the third transistor is coupled to the third control signal terminal, a first electrode of the third transistor is coupled to the control electrode of the drive transistor, and a second electrode of the third transistor is coupled to the second electrode of the drive transistor.

In some examples, the data writing circuit is further configured to: in response to a fourth control signal applied to a fourth control signal terminal, input the data voltage applied to a data signal terminal to the first electrode of the drive transistor.

In some examples, the data writing circuit includes a fourth transistor. A control electrode of the fourth transistor is coupled to the fourth control signal terminal, a first electrode of the fourth transistor is coupled to the data signal terminal, and a second electrode of the fourth transistor is coupled to the first electrode of the drive transistor.

In some examples, a duration of an active level of the fourth control signal is not longer than a duration of an active level of the first control signal.

In some examples, the data writing circuit is further configured to: in response to a fifth control signal applied to a fifth control signal terminal and a sixth control signal applied to a sixth control signal terminal, input the data voltage applied to a data signal terminal to the first electrode of the drive transistor. An active level of the fifth control signal and an active level of the sixth control signal have second overlapping time. A kickoff moment of the active level of the fifth control signal is earlier than a kickoff moment of the active level of the sixth control signal.

In some examples, the data writing circuit includes a fifth transistor and a sixth transistor. A control electrode of the fifth transistor is coupled to the fifth control signal terminal, a first electrode of the fifth transistor is coupled to the first electrode of the drive transistor, and a second electrode of the fifth transistor is coupled to a first electrode of the sixth transistor. A control electrode of the sixth transistor is coupled to the sixth control signal terminal, and a second electrode of the sixth transistor is coupled to the data signal terminal.

In some examples, a duration of an active level of at least one of the fifth control signal and the sixth control signal is substantially the same as a duration an active level of the second control signal.

In some examples, the kickoff moment of the active level of the fifth control signal is earlier than a kickoff moment of the active level of the second control signal, and the kickoff moment of the active level of the second control signal is earlier than the kickoff moment of the active level of the sixth control signal.

In some examples, the fifth control signal terminal and the second control signal terminal are the same signal terminal.

In some examples, the pixel circuit further includes an element reset circuit coupled to the light emitting device. The element reset circuit is configured to: in response to a seventh control signal of a seventh control signal terminal, provide a second initialization signal of a second initialization signal terminal to the light emitting device.

In some examples, the seventh control signal terminal and one of the first control signal terminal to the fourth control signal terminal are the same signal terminal.

An embodiment of the disclosure provides a display panel. The display panel includes the above pixel circuit.

In some examples, the display panel includes: a plurality of sub-pixels, where at least one of the plurality of sub-pixels includes the above pixel circuit; a plurality of control signal lines, where at least one of the plurality of control signal lines is coupled to the pixel circuit in a row of sub-pixels; and a drive and control circuit, where the drive and control circuit is coupled to the plurality of control signal lines.

In some examples, the plurality of control signal lines include a plurality of first control signal lines, a plurality of second control signal lines, a plurality of fifth control signal lines and a plurality of sixth control signal lines. One of the first control signal lines is coupled to a first control signal terminal of a pixel circuit in a row of sub-pixels, one of the second control signal lines is coupled to a second control signal terminal of the pixel circuit in a row of sub-pixels, one of the fifth control signal lines is coupled to a fifth control signal terminal of a pixel circuit in the row of sub-pixels, and one of the sixth control signal lines is coupled to a sixth control signal terminal of a pixel circuit in the row of sub-pixels. The drive and control circuit includes a first driving control circuit. The first driving control circuit includes a plurality of first driving shift register units sequentially arranged, a plurality of first driving shift register units adjacent to each other serve as a first unit group, and one row of sub-pixels correspond to one first unit group. In the first unit group, a first one of first driving shift register units is coupled to a first control signal line coupled to a corresponding row of sub-pixels, a third one of first driving shift register units is coupled to a fifth control signal line coupled to the corresponding row of sub-pixels, a fourth one of first driving shift register units is coupled to a second control signal line coupled to the corresponding row of sub-pixels, and a fifth one of first driving shift register units is coupled to a sixth control signal line coupled to the corresponding row of sub-pixels.

In some examples, the plurality of control signal lines include a plurality of first control signal lines, a plurality of second control signal lines and a plurality of sixth control signal lines. One of the first control signal lines is coupled to a first control signal terminal of a pixel circuit in a row of sub-pixels, one of the second control signal lines is coupled to a second control signal terminal and a fifth control signal terminal of a pixel circuit in the row of sub-pixels, and one of the sixth control signal lines is coupled to a sixth control signal terminal of a pixel circuit in a row of sub-pixels. The drive and control circuit includes a second driving control circuit. The second driving control circuit includes a plurality of second driving shift register units sequentially arranged; a plurality of second driving shift register units adjacent to each other serve as a second unit group, and one row of sub-pixels correspond to one second unit group. In the second unit group, a first one of second driving shift register units is coupled to a first control signal line coupled to a corresponding row of sub-pixels, a third one of second driving shift register units is coupled to a second control signal line coupled to the corresponding row of sub-pixels, and a fifth one of second driving shift register units is coupled to a sixth control signal line coupled to the corresponding row of sub-pixels.

In some examples, the plurality of control signal lines include a plurality of first control signal lines, a plurality of second control signal lines and a plurality of fourth control signal lines. One of the first control signal lines is coupled to a first control signal terminal of a pixel circuit in a row of sub-pixels, one of the second control signal lines is coupled to a second control signal terminal of a pixel circuit in a row of sub-pixels, and one of the fourth control signal lines is coupled to a fourth control signal terminal of a pixel circuit in a row of sub-pixels. The drive and control circuit includes a third driving control circuit and a fourth driving control circuit. The third driving control circuit includes a plurality of third driving shift register units sequentially arranged; a plurality of third driving shift register units adjacent to each other serve as a third unit group, and a row of sub-pixels correspond to one third unit group. In the third unit group, a first one of third driving shift register units is coupled to a first control signal line coupled to a corresponding row of sub-pixels, and a fifth one third driving shift register units is coupled to a second control signal line coupled to a corresponding row of sub-pixels. The fourth driving control circuit includes a plurality of fourth driving shift register units sequentially arranged; a row of sub-pixels correspond to one fourth driving shift register unit; and the fourth driving shift register unit is coupled to a fourth control signal line coupled to a corresponding row of sub-pixels.

An embodiment of the disclosure provides a display device. The display device includes the above display panel.

An embodiment of the disclosure provides a drive method for the above pixel circuit. The drive method includes: in a reset stage, resetting a control electrode, a first electrode and a second electrode of a drive transistor by a voltage control circuit, in response to a signal applied to the voltage control circuit before a data voltage is input; in a data writing stage, inputting the data voltage by a data writing circuit in response to a signal applied to the data writing circuit; and in a light emission stage, generating, by the drive transistor according to the data voltage, a drive current for driving a light emitting device to emit light, so as to drive the light emitting device to emit light.

DETAILED DESCRIPTION

Figure 1:
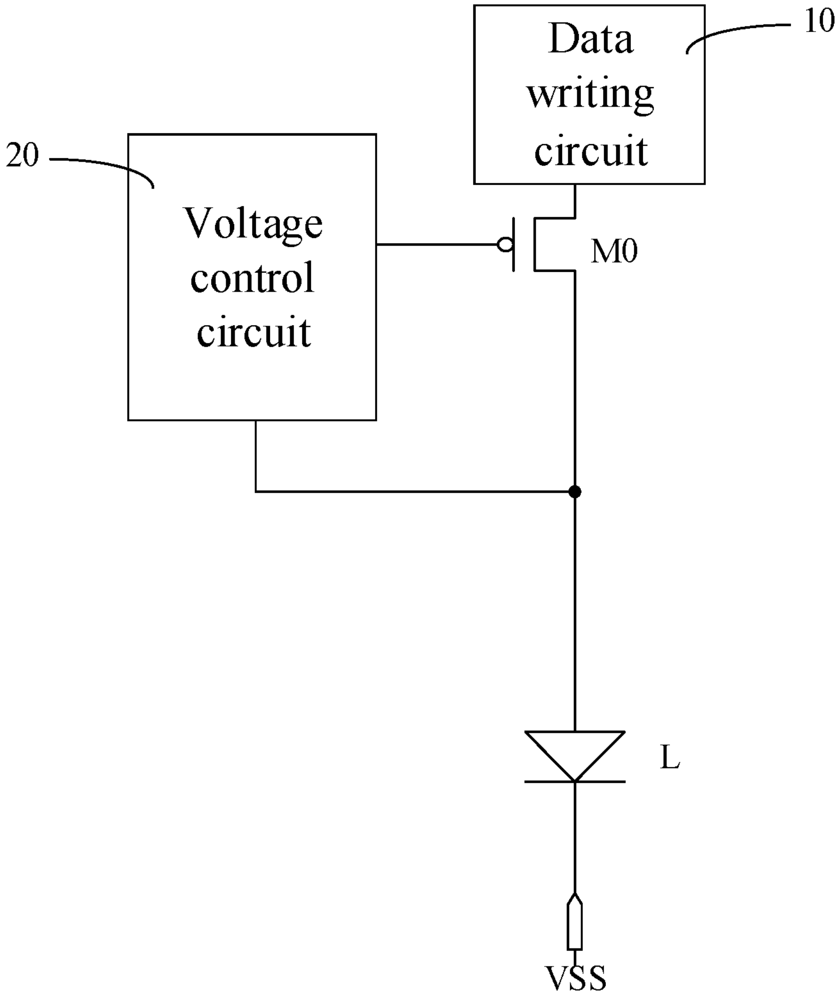
FIG. 1 shows a schematic structural diagram of a pixel circuit according to an embodiment of the disclosure.

In order to make objectives, technical solutions and advantages of embodiments of the disclosure clearer, the technical solutions of the disclosure will be clearly and completely described below in combination with accompanying drawings in the embodiments of the disclosure. Apparently, the described embodiments are merely some embodiments rather than all embodiments of the disclosure. In addition, embodiments of the disclosure and features in the embodiments can be combined with each other without conflict. On the basis of the described embodiments of the disclosure, all other embodiments obtained by those of ordinary skill in the art without making creative efforts fall within the scope of protection of the disclosure.

Unless otherwise defined, technical terms or scientific terms used in the disclosure should have the ordinary meanings understood by those of ordinary skill in the art to which the disclosure belongs. “First”, “second” and other similar words used in the disclosure do not indicate any order, quantity or importance, but are merely used to distinguish between different components. “Comprise”, “include” or other similar words mean that an element or object appearing before the word contains elements or objects listed after the word and equivalents thereof, without excluding other elements or objects. “Connected”, “connected with each other” or other similar words are not limited to physical or mechanical connections, but can include electrical connections, whether direct or indirect.

It should be noted that sizes and shapes of all figures in accompanying drawings do not reflect true scales and are merely intended to illustrate contents of the disclosure. In addition, throughout the description, identical or similar reference numerals denote identical or similar elements or elements having identical or similar functions.

It should be noted that in an actual process, due to a limitation of process conditions or other factors, the same as mentioned in the disclosure cannot be completely the same, and there may be some measurement errors. Therefore, a fluctuation within 20% of the same relation in embodiments of the disclosure is allowable, which all fall within the scope of protection of the disclosure.

In some embodiments of the disclosure, a display device may include a display panel. The display panel may include a substrate. Herein, the substrate may include a display region and a non-display region (that is, a region of the substrate other than the display region). The display region may include a plurality of pixel units arranged in an array. In some embodiments, each pixel unit includes sub-pixels in the same color or sub-pixels in a plurality of different colors. For example, the pixel units may include red sub-pixels, green sub-pixels and blue sub-pixels, and color display may be implemented by mixing red, green and blue. Alternatively, the pixel units may include red sub-pixels, green sub-pixels, blue sub-pixels and white sub-pixels, and color display may be implemented by mixing red, green, blue and white. During practical application, illumination colors of the sub-pixels in the pixel units may be designed and determined according to practical application scenarios, and are not limited herein. The pixel units including red sub-pixels, green sub-pixels and blue sub-pixels are taken as an example for description below.

In some embodiments of the disclosure, each sub-pixel may include a pixel circuit, and the pixel circuit may include a drive transistor M0 and a light emitting device L, so as to control the light emitting device L to emit light, thereby enabling the display panel to implement a image display function. However, a threshold voltage Vth of the drive transistor M0 may shift due to a process, aging and other reasons, which may affect a generated drive current. Moreover, a hysteresis effect during switching between a high gray scale and a low gray scale may cause a ghosting.

In order to solve the above problems, an embodiment of the disclosure provides some pixel circuits. As shown in FIG. 1, the pixel circuit may include: a drive transistor M0, a data writing circuit 10 and a light emitting device L. The data writing circuit 10 is coupled to the drive transistor M0, and a voltage control circuit 20 is coupled to the drive transistor M0. In addition, the drive transistor M0 may be configured to generate, according to a data voltage, a current for driving the light emitting device L to emit light. The data writing circuit 10 may be configured to provide the data voltage in response to an applied signal. Moreover, the voltage control circuit 20 may be configured to reset a control electrode, a first electrode and a second electrode of the drive transistor M0 in response to the loaded signal before the data voltage is input.

According to the pixel circuit provided in an embodiment of the disclosure, by arranging the voltage control circuit, the control electrode, the first electrode and the second electrode of the drive transistor may be reset before the data voltage is input. In this way, while the pixel circuit works in each display frame, before the data voltage is input, a voltage of the control electrode of the drive transistor is substantially the same, a voltage of the first electrode of the drive transistor is substantially the same, and a voltage of the second electrode of the drive transistor is substantially the same, thereby solving the ghosting problem caused by a hysteresis effect during switching between a high gray scale and a low gray scale.

Figure 2:
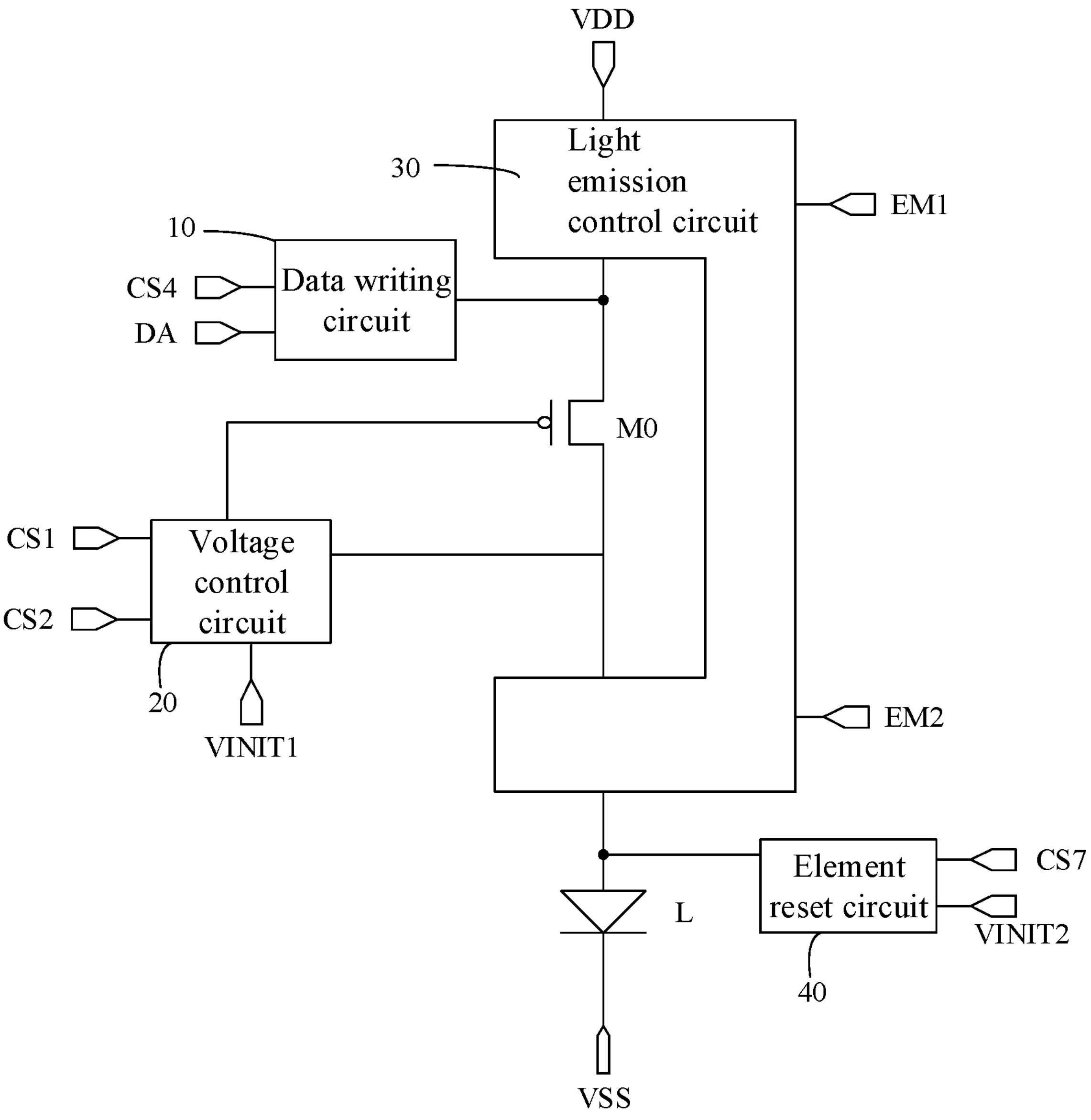
FIG. 2 shows a schematic structural diagram of another pixel circuit according to an embodiment of the disclosure.

In some embodiments of the disclosure, as shown in FIG. 2, the voltage control circuit 20 may be coupled to a first control signal terminal CS1, a first initialization signal terminal VINIT 1, a second control signal terminal CS2, and the control electrode and the second electrode of the drive transistor M0. In addition, the voltage control circuit 20 is further configured to, in response to a first control signal cs1 applied to the first control signal terminal CS1, provide a first initialization signal applied to the first initialization signal terminal VINIT1 to the control electrode of the drive transistor M0, so as to reset the control electrode of the drive transistor M0, and is configured to reset the first electrode and the second electrode of the drive transistor M0 in response to a second control signal cs2 applied to the second control signal terminal CS2. Further, the voltage control circuit 20 is further configured to compensate, while the data voltage is input, a threshold voltage of the drive transistor M0 in response to the second control signal cs2 applied to the second control signal terminal CS2.

In some embodiments of the disclosure, as shown in FIG. 2, the data writing circuit 10 may be coupled to a fourth control signal terminal CS4, a data signal terminal DA and the first electrode of the drive transistor M0. In addition, the data writing circuit 10 may be configured to provide, in response to a fourth control signal cs4 applied to the fourth control signal terminal CS4, the data voltage applied to the data signal terminal DA to the first electrode of the drive transistor M0.

In some embodiments of the disclosure, as shown in FIG. 2, the pixel circuit may further include a light emission control circuit 30. The light emission control circuit 30 may be coupled to the drive transistor M0 and the light emitting device L. In addition, the light emission control circuit 30 may be configured to, in response to a first light emission control signal em1 from a first light emission control signal terminal EM1, cause the first electrode of the drive transistor M0 to be coupled to a first power supply terminal; and cause the second electrode of the drive transistor M0 to be coupled to the light emitting device L in response to a second light emission control signal em2 from a second light emission control signal terminal EM2. In some embodiments, the light emission control circuit 30 may be coupled to the first power supply terminal, the first electrode and the second electrode of the drive transistor M0, and a first electrode of the light emitting device L.

In some embodiments of the disclosure, as shown in FIG. 2, the pixel circuit may further include an element reset circuit 40. The element reset circuit 40 is coupled to the light emitting device L. In addition, the element reset circuit 40 is configured to provide a second initialization signal from a second initialization signal terminal VINIT2 to the light emitting device L in response to a seventh control signal cs7 from a seventh control signal terminal CS7. In some embodiments, the element reset circuit 40 may be coupled to the seventh control signal terminal CS7, the second initialization signal terminal VINIT2, and the first electrode of the light emitting device L.

In some embodiments of the disclosure, the first electrode of the light emitting device L may be coupled to the second electrode of the drive transistor M0, or the first electrode of the light emitting device L may be coupled to the second electrode of the drive transistor M0 via the light emission control circuit 30. The second electrode of the light emitting device L may be coupled to a second power supply terminal VSS. In addition, the first electrode of the light emitting device L may be an anode thereof, and the second electrode may be a cathode thereof. In some embodiments, the light emitting device L may be an electroluminescent diode. For example, the light emitting device L may include at least one of a micro light emitting diode (Micro LED), an organic light emitting diode (OLED), and a quantum dot light emitting diode (QLED). During practical application, the specific structure of the light emitting device L may be designed and determined according to practical application scenarios, and is not limited herein.

In some embodiments of the disclosure, as shown in FIGS. 1 and 2, the drive transistor M0 may be a P-type transistor. The first electrode of the drive transistor M0 may be a source, the second electrode of the drive transistor M0 may be a drain. When the drive transistor M0 is in a saturation state, a current flows from the source to the drain of the drive transistor M0. Alternatively, the drive transistor M0 may be an N-type transistor, which is not limited herein.

Figure 3:
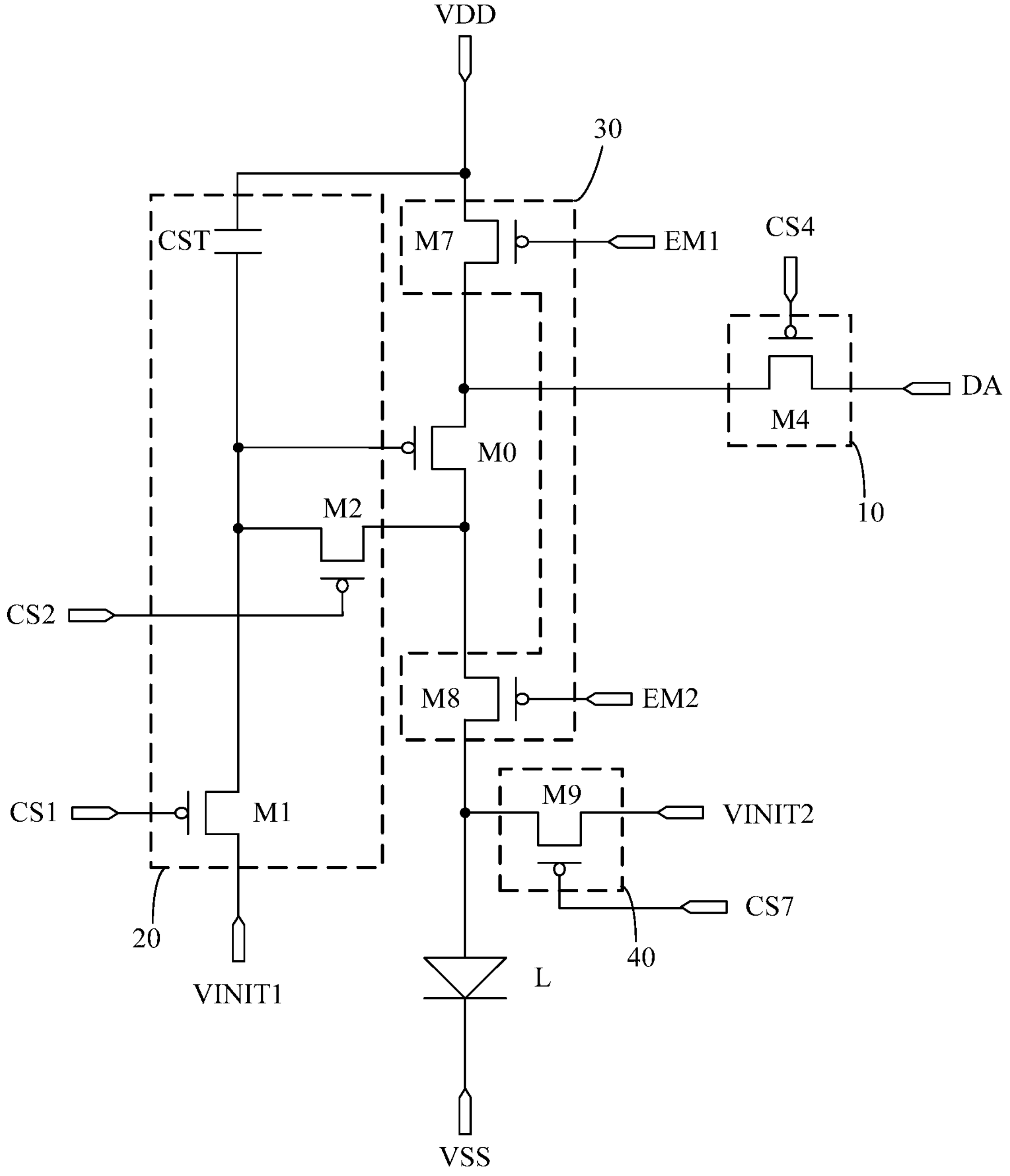
FIG. 3 shows a specific schematic structural diagram of a pixel circuit according to an embodiment of the disclosure.

In some embodiments of the disclosure, as shown in FIG. 3, the voltage control circuit 20 may include: a first transistor M1, a second transistor M2 and a storage capacitor CST. A control electrode of the first transistor M1 is coupled to the first control signal terminal CS1, a first electrode of the first transistor M1 is coupled to the first initialization signal terminal VINIT1, and a second electrode of the first transistor M1 is coupled to the control electrode of the drive transistor M0. Moreover, a control electrode of the second transistor M2 is coupled to the second control signal terminal CS2, a first electrode of the second transistor M2 is coupled to the control electrode of the drive transistor M0, and a second electrode of the second transistor M2 is coupled to the second electrode of the drive transistor M0. Moreover, a first electrode of the storage capacitor CST is coupled to the control electrode of the drive transistor M0, and a second electrode of the storage capacitor CST is coupled to the first electrode of the drive transistor M0.

In some embodiments, the first transistor M1 may be turned on under the control of an active level of the first control signal cs1, and may be turned off under the control of an inactive level of the first control signal cs1. For example, the first transistor M1 is a P-type transistor, an active level of the first control signal cs1 is a low level, and an inactive level of the first control signal cs1 is a high level. Alternatively, the first transistor M1 is an N-type transistor, an active level of the first control signal cs1 is a high level, and an inactive level of the first control signal cs1 is a low level.

In some embodiments, the second transistor M2 may be turned on under the control of an active level of the second control signal cs2, and may be turned off under the control of an inactive level of the second control signal cs2. For example, the second transistor M2 is a P-type transistor, an active level of the second control signal cs2 is a low level, and an inactive level of the second control signal cs2 is a high level. Alternatively, the second transistor M2 is an N-type transistor, an active level of the second control signal cs2 is a high level, and an inactive level of the second control signal cs2 is a low level.

In some embodiments of the disclosure, as shown in FIG. 3, the data writing circuit 10 may include a fourth transistor M4. A control electrode of the fourth transistor M4 is coupled to a fourth control signal terminal CS4, a first electrode of the fourth transistor M4 is coupled to a data signal terminal DA, and a second electrode of the fourth transistor M4 is coupled to the first electrode of the drive transistor M0. In some embodiments, the fourth transistor M4 may be turned on under the control of an active level of the fourth control signal cs4, and may be turned off under the control of an inactive level of the fourth control signal cs4. For example, the fourth transistor M4 is a P-type transistor, an active level of the fourth control signal cs4 is a low level, and an inactive level of the fourth control signal cs4 is a high level. Alternatively, the fourth transistor M4 is an N-type transistor, an active level of the fourth control signal cs4 is a high level, and an inactive level of the fourth control signal cs4 is a low level.

It should be noted that in an embodiment of the disclosure, preferably, one transistor may be arranged in the data writing circuit 10. In this way, less transistors are included in the pixel circuit, and an occupied space thereof in the display panel is small.

In some embodiments of the disclosure, as shown in FIG. 3, the light emission control circuit 30 may include a seventh transistor M7 and an eighth transistor M8. A control electrode of the seventh transistor M7 is coupled to the first light emission control signal terminal EM1, a first electrode of the seventh transistor M7 is coupled to the first power supply terminal, and a second electrode of the seventh transistor M7 is coupled to the first electrode of the drive transistor M0. Moreover, a control electrode of the eighth transistor M8 is coupled to the second light emission control signal terminal EM2, a first electrode of the eighth transistor M8 is coupled to the second electrode of the drive transistor M0, and a second electrode of the eighth transistor M8 is coupled to the light emitting device L.

In some embodiments, the seventh transistor M7 may be turned on under the control of an active level of the first light emission control signal em1, and may be turned off under the control of an inactive level of the first light emission control signal em1. For example, the seventh transistor M7 is a P-type transistor, an active level of the first light emission control signal em1 is a low level, and an inactive level of the first light emission control signal em1 is a high level. Alternatively, the seventh transistor M7 is an N-type transistor, an active level of the first light emission control signal em1 is a high level, and an inactive level of the first light emission control signal em1 is a low level.

In some embodiments, the eighth transistor M8 may be turned on under the control of an active level of the second light emission control signal em2, and may be turned off under the control of an inactive level of the second light emission control signal em2. For example, under the condition that the eighth transistor M8 is a P-type transistor, an active level of the second light emission control signal em2 is a low level, and an inactive level of the second light emission control signal em2 is a high level. Alternatively, under the condition that the eighth transistor M8 is an N-type transistor, an active level of the second light emission control signal em2 is a high level, and an inactive level of the second light emission control signal em2 is a low level.

In some embodiments of the disclosure, as shown in FIG. 3, the element reset circuit 40 may include a ninth transistor M9. A control electrode of the ninth transistor M9 is coupled to the seventh control signal terminal CS7, a first electrode of the ninth transistor M9 is coupled to the second initialization signal terminal VINIT2, and a second electrode of the ninth transistor M9 is coupled to the light emitting device L. In some embodiments, the ninth transistor M9 may be turned on under the control of an active level of the seventh light emission control signal, and may be turned off under the control of an inactive level of the seventh light emission control signal. For example, the ninth transistor M9 is a P-type transistor, an active level of the seventh light emission control signal is a low level, and an inactive level of the seventh light emission control signal is a high level. Alternatively, the ninth transistor M9 is an N-type transistor, an active level of the seventh light emission control signal is a high level, and an inactive level of the seventh light emission control signal is a low level.

Generally, a transistor having an active layer made of a low temperature poly-silicon (LTPS) material has a high migration rate, may be made thinner and less, and has lower power consumption, etc. During specific implementation, a material of an active layer of at least one of the above transistors may be set as a low temperature poly-silicon material. In this way, the above transistor may be an LTPS type transistor, such that a pixel circuit may have a high migration rate, may be made thinner and less, and has lower power consumption, etc.

Generally, a transistor having an active layer made of a metal oxide semiconductor material has a relatively small leakage current. Therefore, in order to reduce a leakage current, in some embodiments of the disclosure, a material of an active layer of at least one of the above transistors may include a metal oxide semiconductor material, such as indium gallium zinc oxide (IGZO), or other metal oxide semiconductor materials, which is not limited herein. In this way, the above transistor may be an oxide thin film transistor, so as to reduce a leakage current of a pixel circuit.

In some embodiments, all the transistors may be LTPS type transistors. Alternatively, all the transistors may be oxide type transistors. Alternatively, some of the transistors may be oxide type transistors, and the remaining transistors may be LTPS type transistors. For example, the first transistor M1 and the second transistor M2 are oxide type transistors, and the remaining transistors are LTPS type transistors. In this way, processes for preparing the LTPS type transistor and the oxide type transistor are combined to prepare a pixel circuit made of a low temperature poly-silicon oxide (LTPS) such that a leakage current of the control electrode of the drive transistor M0 may be relatively small, and power consumption is relatively low. Therefore, by applying the pixel circuit to a display panel, when a refresh frequency of the display panel is reduced for display, display uniformity may be ensured.

During specific implementation, based on a type of a transistor and a signal of a control electrode thereof, the control electrode of the transistor may serve as a gate, a first electrode of the transistor may serve as a source, and a second electrode of the transistor may serve as a drain; or, a first electrode of the transistor may serve as a drain, and a second electrode of the transistor may serve as s source, which may be designed and determined according to actual application scenario, and is not be specifically distinguished herein.

What are mentioned above are merely examples taken to illustrate the specific structure of each circuit in the pixel circuits provided in an embodiment of the disclosure. During specific implementation, the specific structure of the above circuit is not limited to the above structure provided in an embodiment of the disclosure, and may be other structures known by those skilled in the art, which all fall within the scope of protection of the disclosure, and are not limited herein.

In some embodiments of the disclosure, the first power supply terminal may be configured to provide a constant first power supply voltage, and the first power supply voltage is generally positive. Moreover, the second power supply terminal may be configured to provide a constant second power supply voltage, and the second power supply voltage may generally be a grounding voltage or negative. During practical application, specific values of the first power supply voltage and the second power supply voltage may be designed and determined according to practical application scenarios, and are not limited herein.

What are mentioned above are merely examples taken to illustrate the specific structure of each circuit in the pixel circuits provided in an embodiment of the disclosure. During specific implementation, the specific structure of the above circuit is not limited to the above structure provided in an embodiment of the disclosure, and may be other structures known by those skilled in the art, which all fall within the scope of protection of the disclosure, and are not limited herein.

Figure 4A:
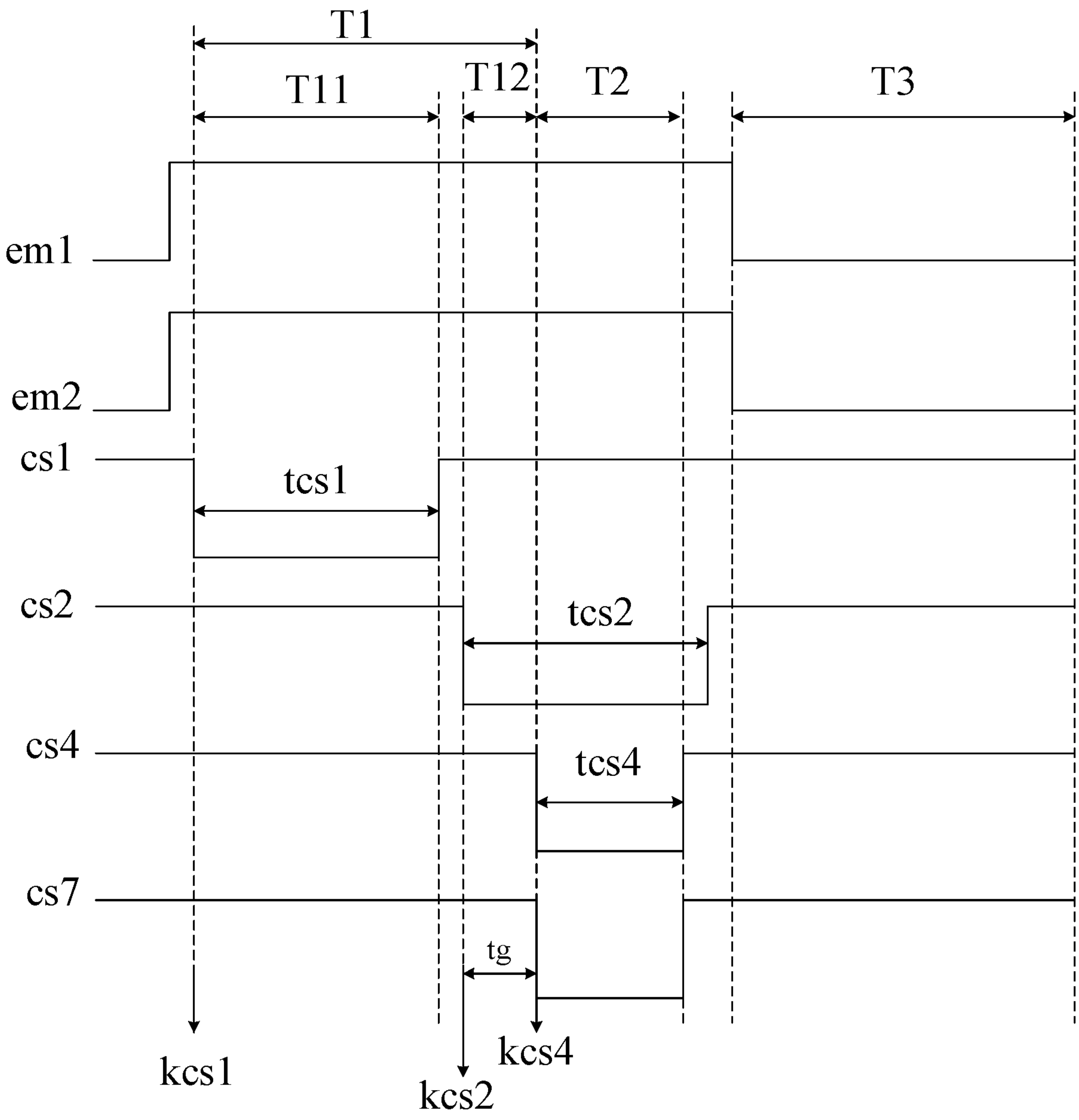
FIG. 4A shows a timing chart of signals according to an embodiment of the disclosure.

Each of the above transistors being a P-type transistor is taken as an example for description. In some embodiments, a timing chart of signals corresponding to a pixel circuit shown in FIG. 3 is shown in FIG. 4A. A duration tcs1 of an active level (for example, a high level) of the first control signal cs1 may be substantially the same as a duration tcs2 of an active level (for example, a high level) of the second control signal cs2. In addition, a kickoff moment kcs1 of the active level (for example, a high level) of the first control signal cs1 is earlier than a kickoff moment kcs2 of the active level of the second control signal cs2 (for example, a high level).

In some embodiments, as shown in FIG. 4A, the active level (for example, a high level) of the first control signal cs1 and the active level (for example, a high level) of the second control signal cs2 may have no overlapping time.

In some embodiments, as shown in FIG. 4A, a kickoff moment kcs4 of an active level (for example, a high level) of the fourth control signal cs4 may be later than a kickoff moment kcs4 of the active level (for example, a high level) of the second control signal cs2. In addition, there may be a time gap tg between the kickoff moment kcs4 and the kickoff moment kcs2. In some embodiments, the time gap tg may be shorter than, longer than or equal to a duration of a data writing stage. During practical application, the time gap tg may be determined according to requirements of practical applications, which is not limited herein.

In some embodiments, as shown in FIG. 4A, a duration tcs4 of the active level (for example, a high level) of the fourth control signal cs4 may be shorter than a duration tcs1 of the active level (for example, a high level) of the first control signal cs1.

In some embodiments, as shown in FIG. 4A, the fourth control signal cs4 and the seventh control signal cs7 may be controlled to have substantially the same timing.

In some embodiments, as shown in FIG. 4A, the first light emission control signal em1 and the second light emission control signal em2 may be controlled to have substantially the same timing.

Figure 5:
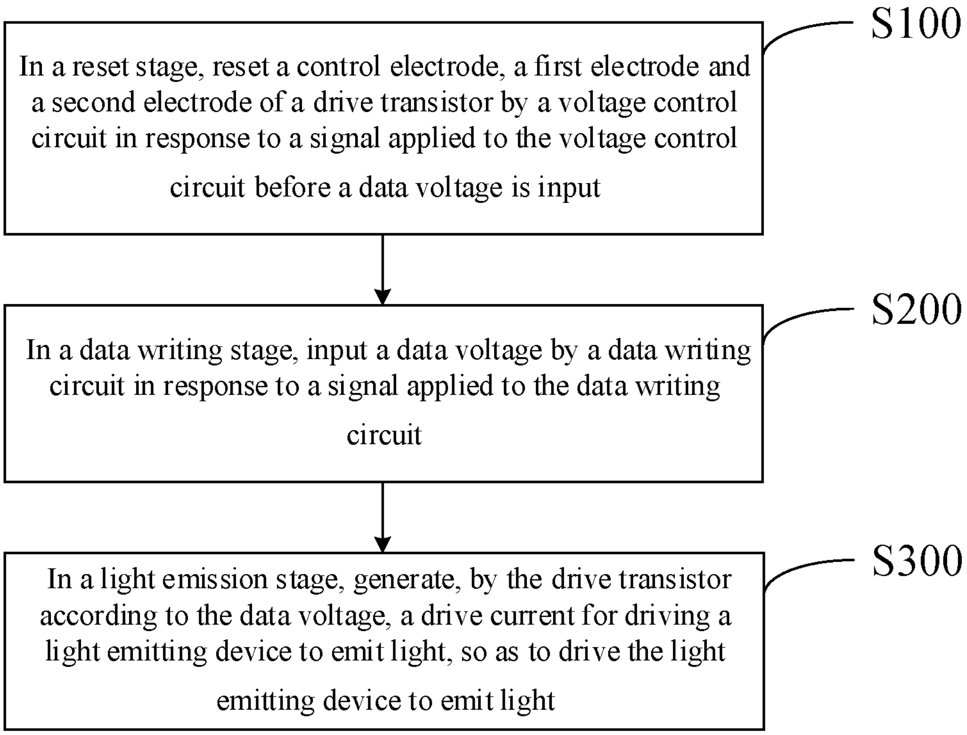
FIG. 5 shows a flow chart of a drive method for a pixel circuit according to an embodiment of the disclosure.

As shown in FIG. 5, a drive method for a pixel circuit provided in an embodiment of the disclosure may include steps as follows.

S100: in a reset stage, reset a control electrode, a first electrode and a second electrode of a drive transistor by a voltage control circuit in response to a signal applied to the voltage control circuit before a data voltage is input.

S200: in a data writing stage, input a data voltage by a data writing circuit in response to a signal applied to the data writing circuit.

S300: in a light emission stage, generate, by the drive transistor according to the data voltage, a drive current for driving a light emitting device to emit light, so as to drive the light emitting device to emit light.

A working process of a pixel circuit provided in an embodiment of the disclosure in one display frame is described below by taking the structure of the pixel circuit shown in FIG. 3 as an example and in combination with the signal timing chart shown in FIG. 4A. The reset stage T1, the data writing stage T2 and the light emission stage T3 in the signal timing chart shown in FIG. 4A are mainly illustrated. The reset stage T1 includes a stage T11 and a stage T12. Sign em1 represents the first light emission control signal em1 applied to the first light emission control signal terminal EM1. Sign em2 represents the second light emission control signal em2 applied to the second light emission control signal terminal EM2. Sign cs1 represents the first control signal cs1 applied to the first control signal terminal CS1. Sign cs2 represents the second control signal cs2 applied to the second control signal terminal CS2. Sign cs4 represents the fourth control signal cs4 applied to the fourth control signal terminal CS4. Sign cs7 represents the seventh control signal cs7 applied to the seventh control signal terminal CS7.

In the stage T11 of the reset stage T1, the second transistor M2 is turned off under the control of the high level of the signal cs2. The fourth transistor M4 is turned off under the control of the high level of the signal cs4. The seventh transistor M7 is turned off under the control of the high level of the signal em1. The eighth transistor M8 is turned off under the control of the high level of the signal em2. The ninth transistor M9 is turned off under the control of the high level of the signal cs7. The first transistor M1 is turned on under the control of the low level of the signal cs1 to provide the first initialization voltage vinit1 applied to the first initialization signal terminal VINIT1 to the control electrode of the drive transistor M0, so as to reset the control electrode of the drive transistor M0, and maintain the voltage of the control electrode of the drive transistor M0 by the storage capacitor CST.

In the stage T12 of the reset stage T1, the first transistor M1 is turned off under the control of the high level of the signal cs1. The fourth transistor M4 is turned off under the control of the high level of the signal cs4. The seventh transistor M7 is turned off under the control of the high level of the signal em1. The eighth transistor M8 is turned off under the control of the high level of the signal em2. The ninth transistor M9 is turned off under the control of the high level of the signal cs7. The second transistor M2 is turned on under the control of the low level of the signal cs2, so as to cause the control electrode to be coupled to the second electrode of the drive transistor M0, such that the drive transistor M0 works in a diode manner. Since the storage capacitor CST maintains the voltage of the control electrode of the drive transistor M0 as the first initialization voltage vinit1, it is possible to change the voltage of the second electrode of the drive transistor M0 into the first initialization voltage vinit1, and change the voltage of the first electrode of the drive transistor M0 into vinit1-Vth. here Vth represents the threshold voltage of the drive transistor M0. In this way, the control electrode, the first electrode and the second electrode of the drive transistor M0 may be reset before the data voltage is written. In addition, after reset, the voltage of the control electrode of the drive transistor M0 is the first initialization voltage vinit1, the voltage of the second electrode changes into the first initialization voltage vinit1, and the voltage of the first electrode changes into vinit1-Vth, while the pixel circuit works in each display frame, before the data voltage is input, the voltage of the control electrode of the drive transistor M0 is substantially the same, the voltage of the first electrode of the drive transistor M0 is substantially the same, and the voltage of the second electrode of the drive transistor M0 is substantially the same, thereby solving the ghosting problem caused by a hysteresis effect during switching between a high gray scale and a low gray scale.

In the data writing stage T2, the first transistor M1 is turned off under the control of the high level of the signal cs1. The seventh transistor M7 is turned off under the control of the high level of the signal em1. The eighth transistor M8 is turned off under the control of the high level of the signal em2. The second transistor M2 is turned on under the control of the low level of the signal cs2, so as to cause the control electrode and the second electrode of the drive transistor M0 to be connected, such that the drive transistor M0 works in a diode manner. The fourth transistor M4 is turned on under the control of the low level of the signal cs4, so as to provide the data voltage Vda applied to the data signal terminal DA to the first electrode of the drive transistor M0, and the control electrode of the drive transistor M0 is charged via the activated second transistor M2 to cause the voltage of the control electrode of the drive transistor M0 to change into Vda+Vth. Moreover, the ninth transistor M9 is turned on under the control of the low level of the signal cs7, so as to provide the second initialization voltage applied to the second initialization signal terminal VINIT 2 to the first electrode of the light emitting device L to initialize the light emitting device L.

In the light emission stage T3, the first transistor M1 is turned off under the control of the high level of the signal cs1. The second transistor M2 is turned off under the control of the high level of the signal cs2. The fourth transistor M4 is turned off under the control of the high level of the signal cs4. The ninth transistor M9 is turned off under the control of the high level of the signal cs7. The seventh transistor M7 is turned on under the control of the low level of the signal em1, so as to provide the first power supply voltage of the first power supply terminal VDD to the first electrode of the drive transistor M0, such that the voltage of the first electrode of the drive transistor M0 is Vdd. The voltage of the control electrode of the drive transistor M0 is Vda+Vth, and the drive current IL flowing the drive transistor M0 is: $IL=K(Vda+Vth-Vdd-Vth)^2=K(Vda-Vdd)^2$. The activated eighth transistor M8 connects the second electrode of the drive transistor M0 to the first electrode of the light emitting device L, thereby providing the drive current IL for the light emitting device L, so as to drive the light emitting device L to emit light. Here, K is a structural constant of the drive transistor M0.

It should be noted that in the T12 stage, the control electrode, the first electrode and the second electrode of the drive transistor M0 may be reset before the data voltage is written. After reset, the voltage of the control electrode of the drive transistor M0 is the first initialization voltage vinit1, the voltage of the second electrode changes into the first initialization voltage vinit1, and the voltage of the first electrode changes into vinit1-Vth. While the pixel circuit works in each display frame, before the data voltage is input, the voltage of the control electrode of the drive transistor M0 is substantially the same, the voltage of the first electrode of the drive transistor M0 is substantially the same, and the voltage of the second electrode of the drive transistor M0 is substantially the same, thereby solving the ghosting problem caused by a hysteresis effect during switching between a high gray scale and a low gray scale.

It should be noted that in the light emission stage T3, the drive current IL for driving the light emitting device L to emit light is independent of the threshold voltage of the drive transistor M0, according to the formula $IL=K(Vda+Vth-Vdd-Vth)^2=K(Vda-Vdd)^2$. As such, the influence of a threshold voltage shift of the drive transistor M0 on light emission of the light emitting device L may be avoided, and light emission stability may be further improved.

It should be noted that the first control signal cs1, the second control signal cs2 and the fourth control signal cs4 may be signals in cascade. The pixel circuit in an embodiment of the disclosure may be applied to a display panel for display switched between a high frequency and a low frequency. Under the condition that the display panel is used for display at a low frequency, the data voltage Vda may be refreshed only in a refresh frame, while the data voltage Vda is not written in a holding frame. For example, the first control signal cs1, the second control signal cs2 and the fourth control signal cs4 are required to be refreshed at a low frequency, so as to control the first transistor M1, the second transistor M2 and the fourth transistor M4 to be refreshed at a low frequency. However, in order to reduce flickers of the light emitting device, the first electrode of the light emitting device is required to be reset at a high frequency, and in this case, the control electrode of the ninth transistor M9 is required to be refreshed at a high frequency. In this case, the signal cs7 is required to be controlled by a separate circuit, and is not cascaded with the signal cs1 and the signal cs2. On this basis, the seventh control signal terminal and the fourth control signal terminal are not set as the same signal terminal.

Figure 4B:
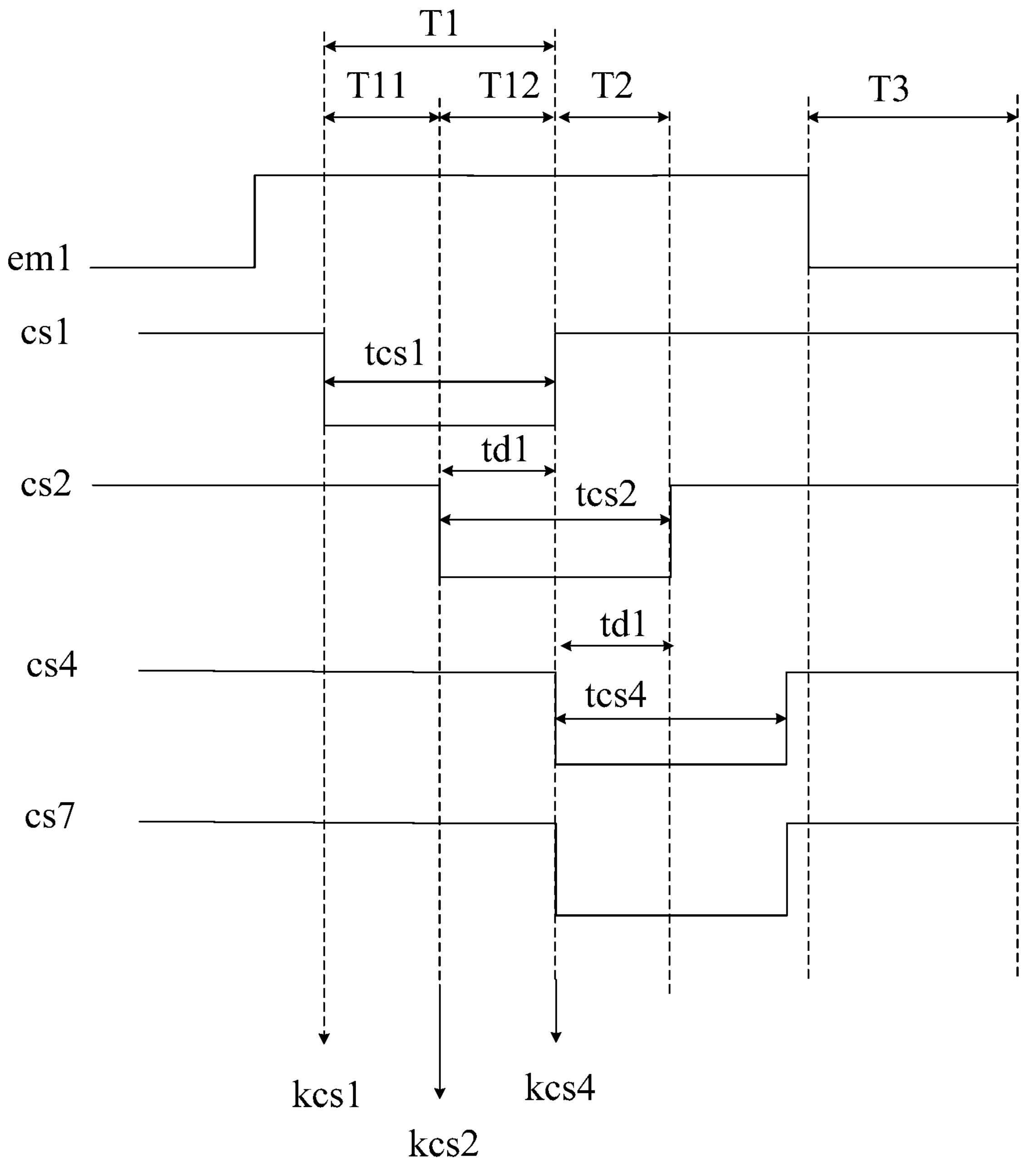
FIG. 4B shows a timing chart of signals according to an embodiment of the disclosure.

An embodiment of the disclosure provides another signal timing chart of a pixel circuit, as shown in FIG. 4B, which is a variation of an implementation mode in the above embodiment. Only the differences between the embodiment and the above embodiment will be described below, and the similarities will not be repeated herein.

In some embodiments, as shown in FIG. 4B, the duration tcs4 of the active level (for example, a high level) of the fourth control signal cs4 may be substantially the same as the duration tcs1 of the active level (for example, a high level) of the first control signal cs1. Moreover, in some embodiments, as shown in FIG. 4B, the fourth control signal cs4 and the seventh control signal cs7 may be controlled to have substantially the same timing.

In some embodiments, as shown in FIG. 4B, the active level (for example, a high level) of the first control signal cs1 and the active level (for example, a high level) of the second control signal cs2 have first overlapping time td1. The active level (for example, a high level) of the second control signal cs2 and the active level (for example, a high level) of the fourth control signal cs4 have first overlapping time td1. In addition, the active level (for example, a high level) of the second control signal cs2 and the active level (for example, a high level) of the seventh control signal cs7 have first overlapping time td1. The first overlapping time td1 may be substantially the same as time of data voltage input (that is, time of the data writing stage T2).

It should be noted that a signal timing chart corresponding to the pixel circuit shown in FIG. 3 may be as shown in FIG. 4B. In the stage T12, the first transistor M1 is turned on under the control of the low level of the signal cs1, such that the first initialization voltage applied to the first initialization signal terminal VINIT1 is provided to the control electrode of the drive transistor M0. The second transistor M2 is turned on under the control of the low level of the signal cs2, so as to cause the control electrode and the second electrode of the drive transistor M0 to be connected, such that the drive transistor M0 works in a diode manner. In this way, the control electrode, the first electrode and the second electrode of the drive transistor M0 may be reset before the data voltage is written. In addition, other processes of the pixel circuit shown in FIG. 3 working in combination with signal timing shown in FIG. 4B may be substantially the same as the process of the pixel circuit shown in FIG. 3 working in combination with signal timing shown in FIG. 4A, and will not be repeated herein.

It should be noted that the first control signal cs1, the second control signal cs2 and the fourth control signal cs4 may be signals in cascade. The pixel circuit in an embodiment of the disclosure may be applied to a display panel for display switched between a high frequency and a low frequency. Under the condition that the display panel is used for display at a low frequency, the data voltage Vda may be refreshed only in a refresh frame, and the data voltage Vda is not written into a holding frame. For example, the first control signal cs1, the second control signal cs2 and the fourth control signal cs4 are required to be refreshed at a low frequency, so as to control the first transistor M1, the second transistor M2 and the fourth transistor M4 to be refreshed at a low frequency. However, in order to reduce flickers of the light emitting device, the first electrode of the light emitting device is required to be reset at a high frequency, and in this case, the control electrode of the ninth transistor M9 is required to be refreshed at a high frequency. In this case, the signal cs7 is required to be controlled by a separate circuit, and is not cascaded with the signal cs1 and the signal cs2. On this basis, the seventh control signal terminal and the fourth control signal terminal are not set as the same signal terminal.

Figure 6:
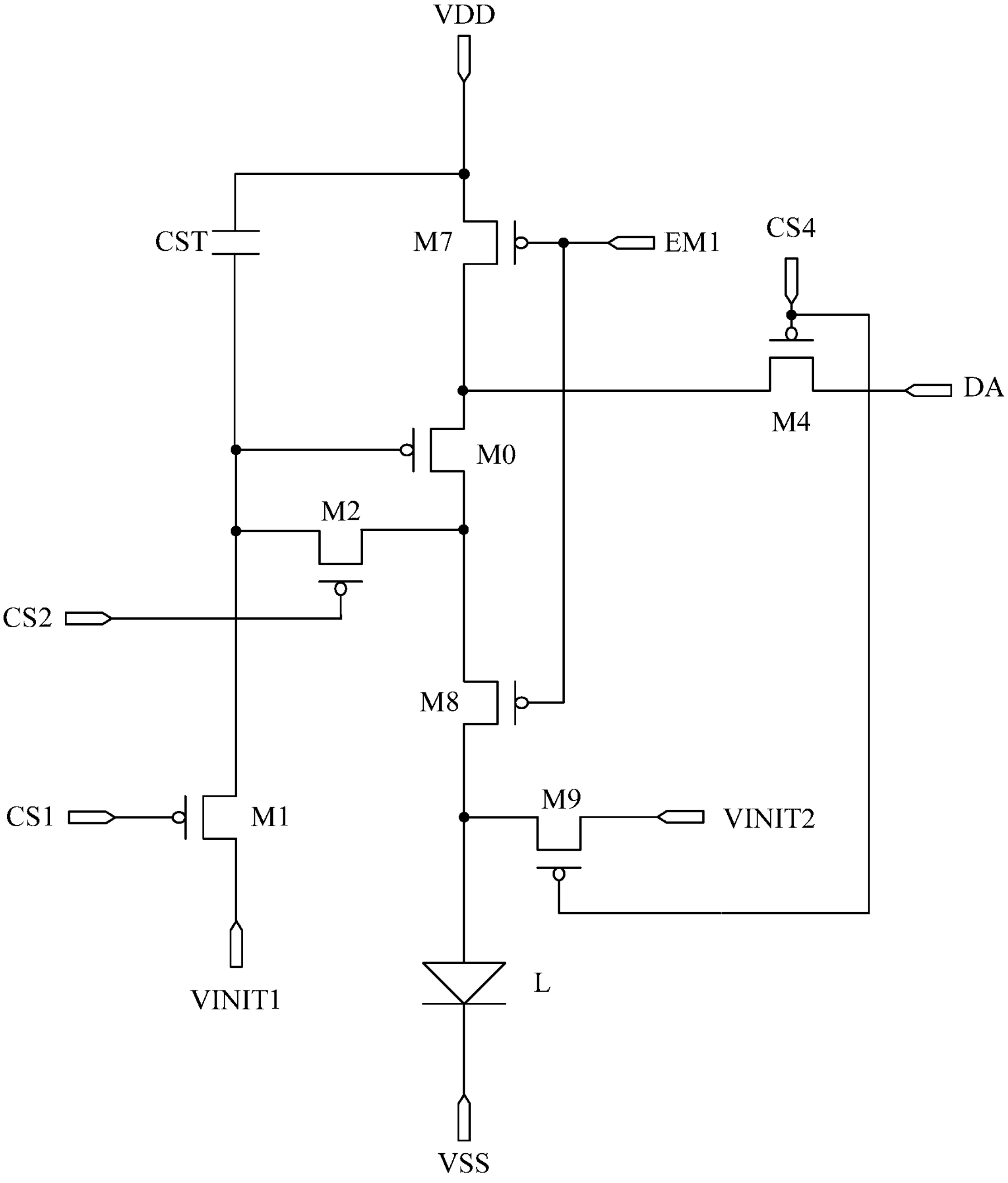
FIG. 6 shows a specific schematic structural diagram of a pixel circuit according to an embodiment of the disclosure.

An embodiment of the disclosure provides some other schematic structural diagrams of the pixel circuit, as shown in FIG. 6, which is a variation of an implementation mode in the above embodiment. Only the differences between the embodiment and the above embodiment will be described below, and the similarities will not be repeated herein.

In some embodiments of the disclosure, the first light emission control signal terminal and the second light emission control signal terminal may be set as the same signal terminal. In this way, the number of signal traces may be decreased to reduce wiring difficulty. In some embodiments, as shown in FIG. 6, a control electrode of the seventh transistor M7 and a control electrode of the eighth transistor M8 both may be coupled to the first light emission control signal terminal EM1. Alternatively, the control electrode of the seventh transistor M7 and the control electrode of the eighth transistor M8 both may be coupled to the second light emission control signal terminal EM2.

In some embodiments of the disclosure, the seventh control signal terminal and the fourth control signal terminal may be set as the same signal terminal. In this way, the number of signal traces may be decreased to reduce wiring difficulty. In some embodiments, as shown in FIG. 6, a control electrode of the fourth transistor M4 and a control electrode of the ninth transistor M9 both may be coupled to the fourth control signal terminal CS4. Alternatively, the control electrode of the fourth transistor M4 and the control electrode of the ninth transistor M9 both may be coupled to the seventh control signal terminal CS7.

Figure 7:
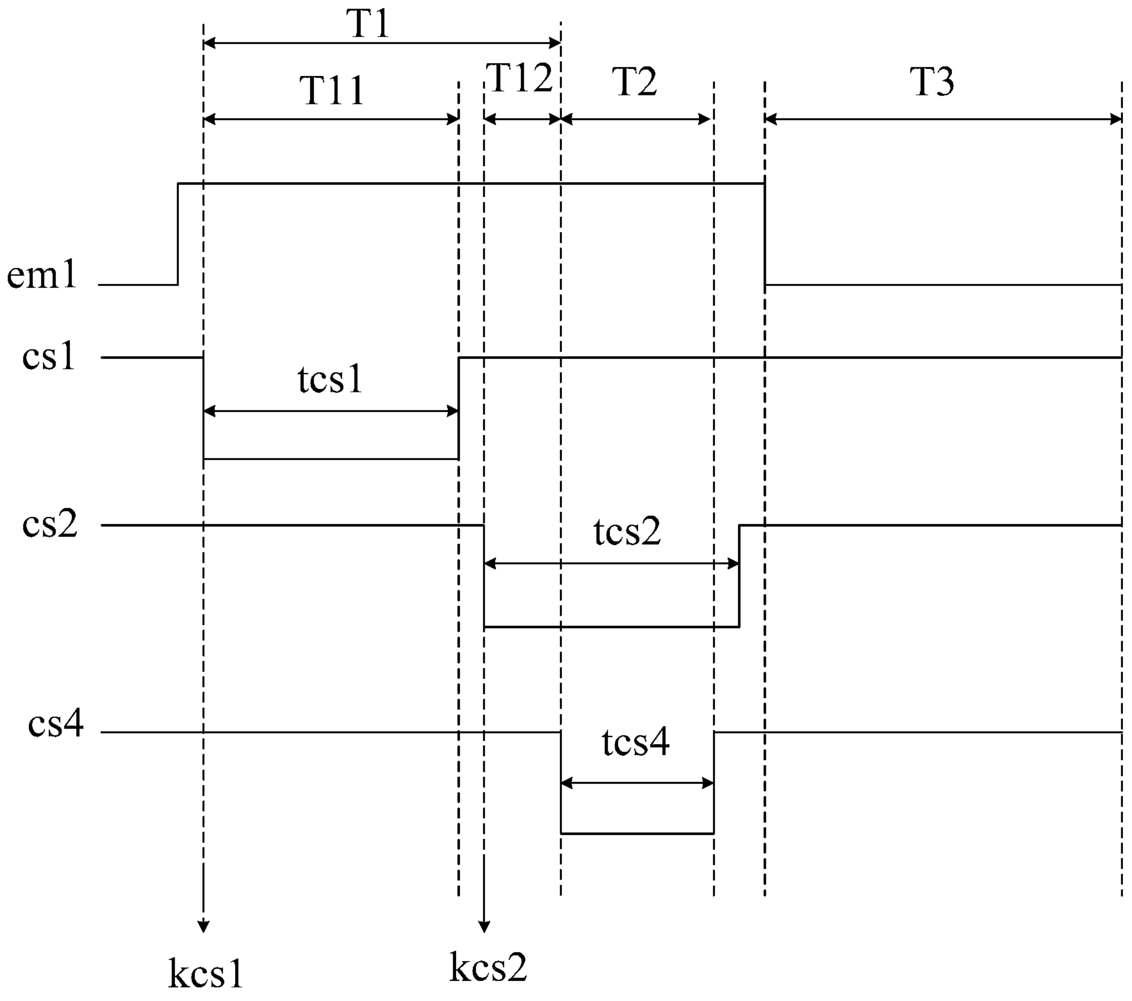
FIG. 7 shows a timing chart of signals according to an embodiment of the disclosure.

It should be noted that a signal timing chart corresponding to the pixel circuit shown in FIG. 6 may be as shown in FIG. 7. The duration tcs4 of the active level (for example, a high level) of the fourth control signal cs4 may be shorter than the duration tcs1 of the active level (for example, a high level) of the first control signal cs1. Moreover, the active level (for example, a high level) of the first control signal cs1 and the active level (for example, a high level) of the second control signal cs2 may have no overlap. In addition, a process of the pixel circuit shown in FIG. 6 working in combination with signal timing shown in FIG. 7 may be substantially the same as the process of the pixel circuit shown in FIG. 3 working in combination with signal timing shown in FIG. 4A, and will not be repeated herein.

Figure 8:
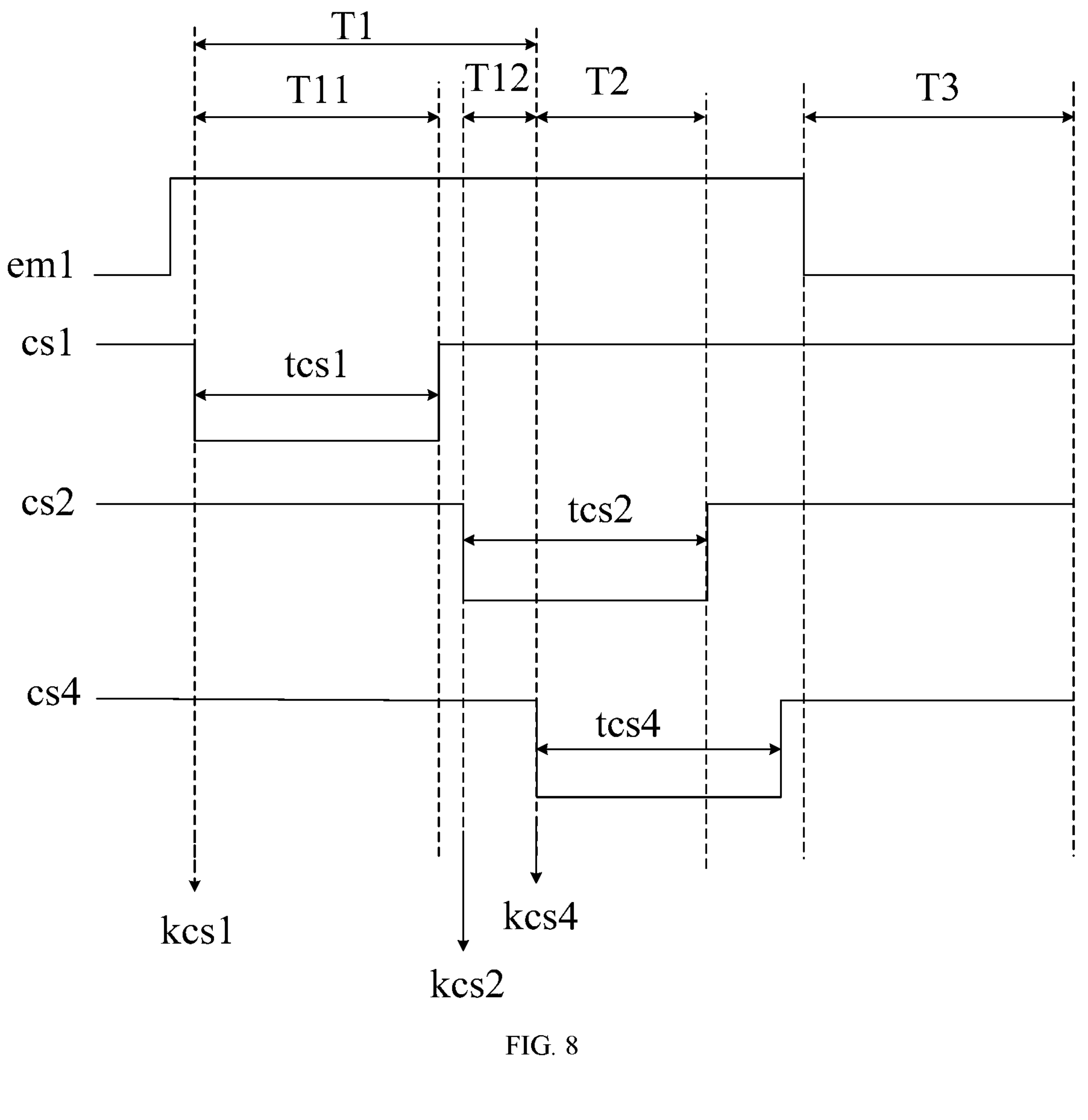
FIG. 8 shows a timing chart of signals according to an embodiment of the disclosure.

It should be noted that a signal timing chart corresponding to the pixel circuit shown in FIG. 6 may be as shown in FIG. 8. The duration tcs4 of the active level (for example, a high level) of the fourth control signal cs4 may be equal to the duration tcs1 of the active level (for example, a high level) of the first control signal cs1. Moreover, the active level (for example, a high level) of the first control signal cs1 and the active level (for example, a high level) of the second control signal cs2 may have no overlap. In addition, a process of the pixel circuit shown in FIG. 6 working in combination with signal timing shown in FIG. 8 may be substantially the same as the process of the pixel circuit shown in FIG. 3 working in combination with signal timing shown in FIG. 4A, and will not be repeated herein.

Figure 9:
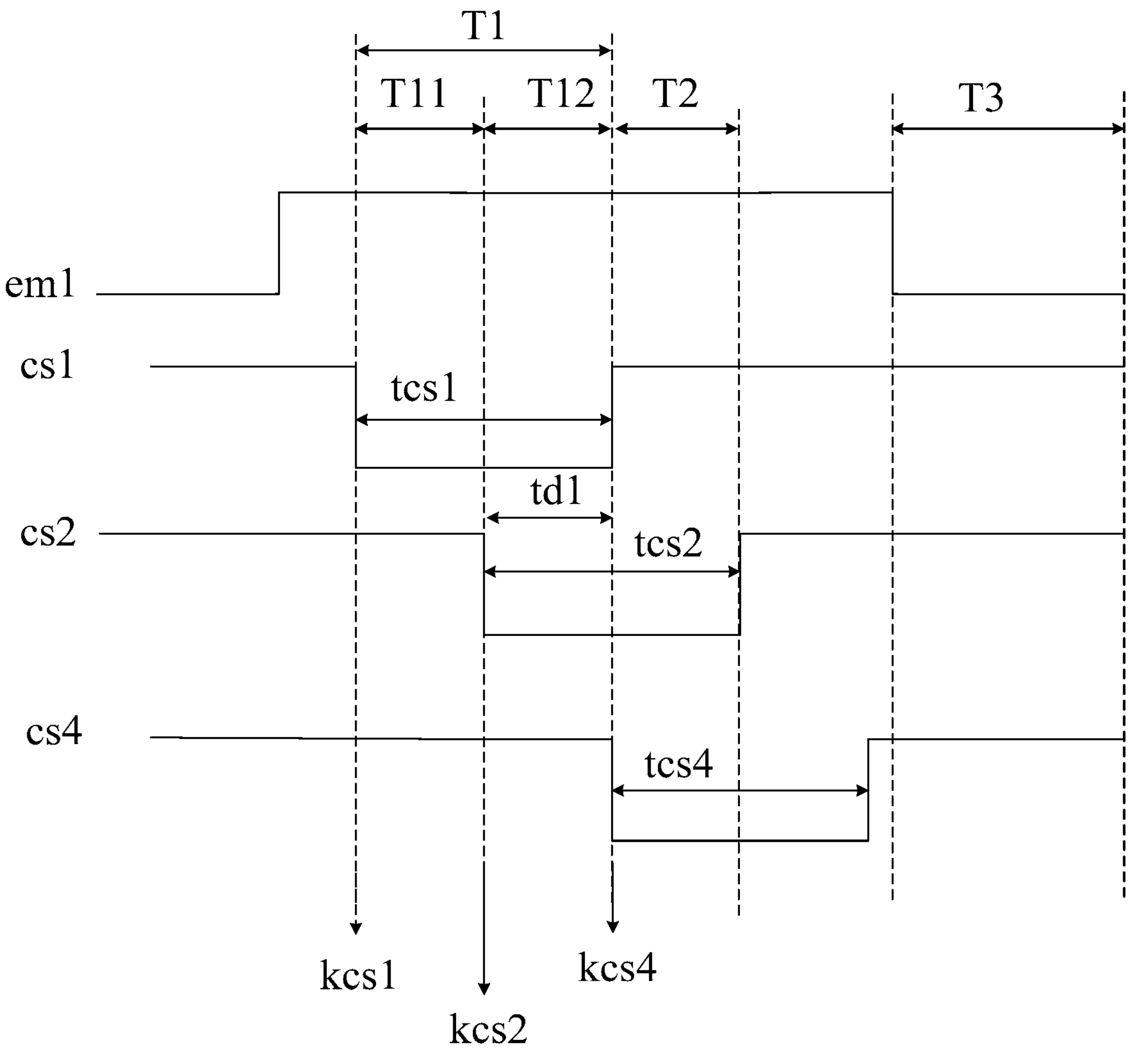
FIG. 9 shows a timing chart of signals according to an embodiment of the disclosure.

It should be noted that a signal timing chart corresponding to the pixel circuit shown in FIG. 6 may be as shown in FIG. 9. The duration tcs4 of the active level (for example, a high level) of the fourth control signal cs4 may be equal to the duration tcs1 of the active level (for example, a high level) of the first control signal cs1. Moreover, the active level (for example, a high level) of the first control signal cs1 and the active level (for example, a high level) of the second control signal cs2 may have overlapping time td1. The first overlapping time td1 may be substantially the same as time of data voltage input (that is, time of the data writing stage T2). In the stage T12, the first transistor M1 is turned on under the control of the low level of the signal cs1, such that the first initialization voltage applied to the first initialization signal terminal VINIT1 is provided to the control electrode of the drive transistor M0. The second transistor M2 is turned on under the control of the low level of the signal cs2, so as to cause the control electrode and the second electrode of the drive transistor M0 to be connected, such that the drive transistor M0 works in a diode manner. In this way, the control electrode, the first electrode and the second electrode of the drive transistor M0 may be reset before the data voltage is written. In addition, other processes of the pixel circuit shown in FIG. 6 working in combination with signal timing shown in FIG. 8 may be substantially the same as the process of the pixel circuit shown in FIG. 3 working in combination with signal timing shown in FIG. 4*a*, and will not be repeated herein.

Certainly, the seventh control signal terminal CS7 and the first control signal terminal CS1 may be set as the same signal terminal. Alternatively, the seventh control signal terminal CS7 and the second control signal terminal CS2 may be set as the same signal terminal. During practical application, the seventh control signal terminal CS7 may be arranged according to requirements of practical applications, which is not limited herein.

Figure 10:
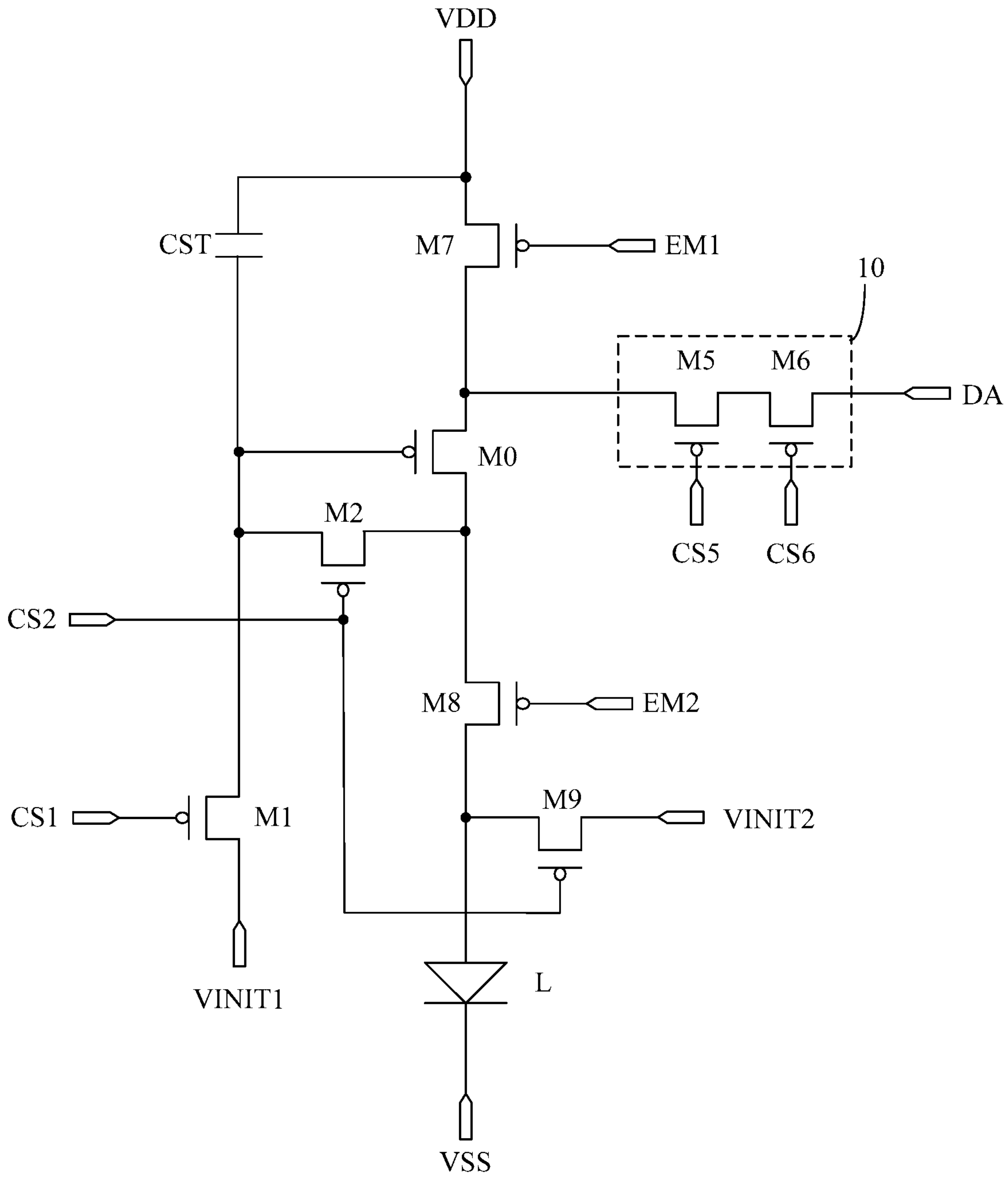
FIG. 10 shows a specific schematic structural diagram of a pixel circuit according to an embodiment of the disclosure.

An embodiment of the disclosure provides yet some other schematic structural diagrams of the pixel circuit, as shown in FIG. 10, which is a variation of an implementation mode in the above embodiment. Only the differences between the embodiment and the above embodiment will be described below, and the similarities will not be repeated herein.

In some embodiments of the disclosure, the seventh control signal terminal CS7 and the second control signal terminal CS2 may be set as the same signal terminal. In this way, the number of signal traces may be decreased to reduce wiring difficulty. In some embodiments, as shown in FIG. 10, the control electrode of the fourth transistor M4 and the control electrode of the ninth transistor M9 both may be coupled to the second control signal terminal CS2. Alternatively, the control electrode of the fourth transistor M4 and the control electrode of the ninth transistor M9 both may be coupled to the seventh control signal terminal CS7.

In some embodiments of the disclosure, as shown in FIG. 10, the data writing circuit 10 is further configured to input, in response to a fifth control signal cs5 applied to a fifth control signal terminal CS5 and a sixth control signal cs6 applied to a sixth control signal terminal CS6, the data voltage applied to the data signal terminal DA to the first electrode of the drive transistor M0. In some embodiments, as shown in FIG. 10, the data writing circuit 10 may include a fifth transistor M5 and a sixth transistor M6. A control electrode of the fifth transistor M5 is coupled to the fifth control signal terminal CS5, a first electrode of the fifth transistor M5 is coupled to the first electrode of the drive transistor M0, and a second electrode of the fifth transistor M5 is coupled to a first electrode of the sixth transistor M6. A control electrode of the sixth transistor M6 is coupled to the sixth control signal terminal CS6, and a second electrode of the sixth transistor M6 is coupled to the data signal terminal DA.

In some embodiments, the fifth transistor M5 may be turned on under the control of an active level of the fifth control signal cs5, and turned off under the control of an inactive level of the fifth control signal cs5. For example, the fifth transistor M5 is a P-type transistor, an active level of the fifth control signal cs5 is a low level, and an inactive level of the fifth control signal cs5 is a high level. Alternatively, the fifth transistor M5 is an N-type transistor, an active level of the fifth control signal cs5 is a high level, and an inactive level of the fifth control signal cs5 is a low level.

In some embodiments, the sixth transistor M6 may be turned on under the control of an active level of the sixth control signal cs6, and turned off under the control of an inactive level of the sixth control signal cs6. For example, the sixth transistor M6 is a P-type transistor, an active level of the sixth control signal cs6 is a low level, and an inactive level of the sixth control signal cs6 is a high level. Alternatively, the sixth transistor M6 is an N-type transistor, an active level of the sixth control signal cs6 is a high level, and an inactive level of the sixth control signal cs6 is a low level.

In some embodiments of the disclosure, a duration of an active level of at least one of the fifth control signal cs5 and the sixth control signal cs6 is substantially the same as the duration the active level of the second control signal cs2. In some embodiments, as shown in FIG. 11, the duration tcs1 of the active level (for example, a high level) of the first control signal cs1, the duration tcs2 of the active level (for example, a high level) of the second control signal cs2, the duration tcs5 of the active level (for example, a high level) of the fifth control signal cs5, and the duration tcs6 of the active level (for example, a high level) of the sixth control signal cs6 may be substantially the same.

Figure 11:
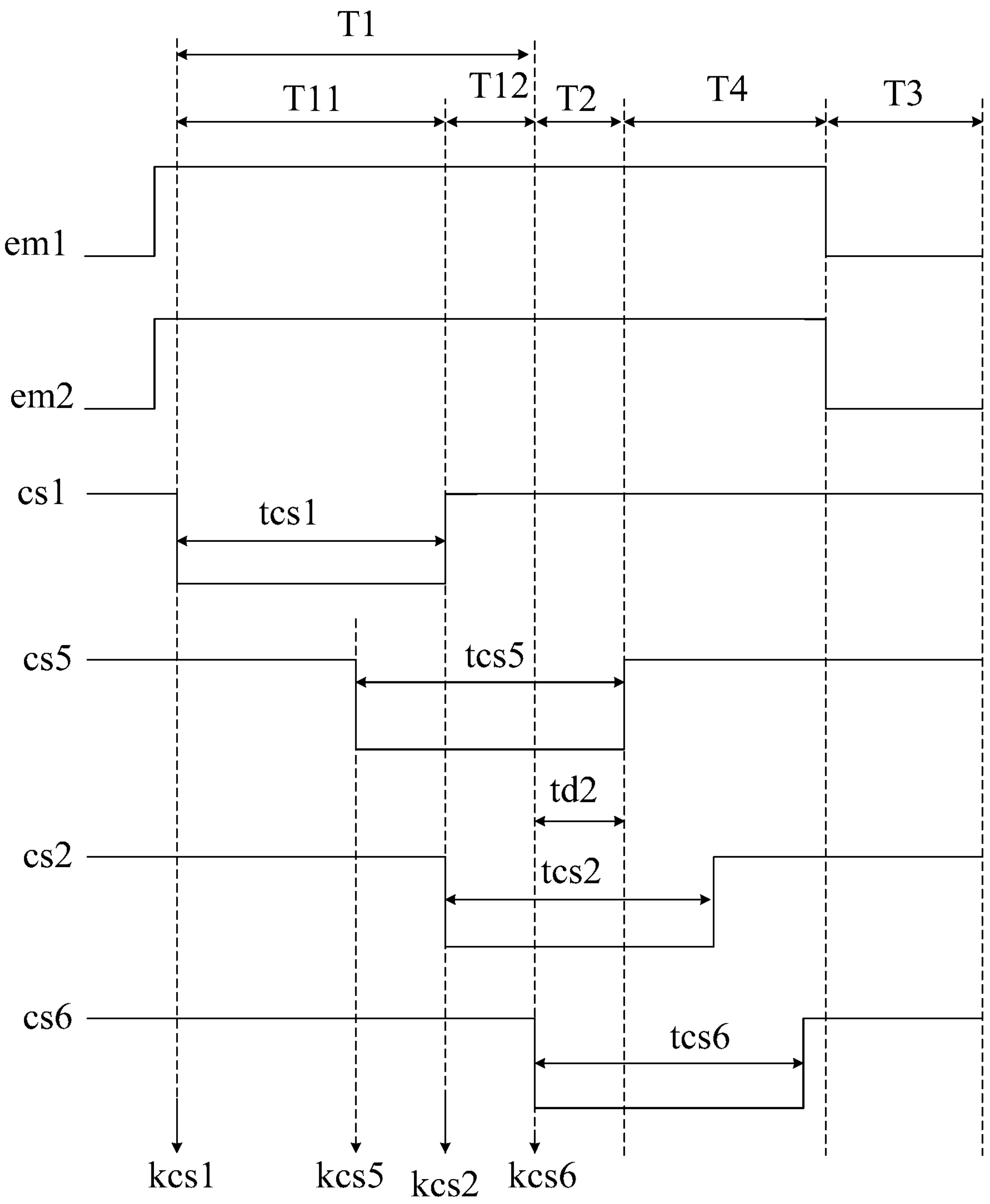
FIG. 11 shows a timing chart of signals according to an embodiment of the disclosure.

In some embodiments of the disclosure, as shown in FIG. 11, the active level (for example, a high level) of the first control signal cs1 and the active level (for example, a high level) of the second control signal cs2 may have no overlap. The active level of the fifth control signal cs5 and the active level of the sixth control signal cs6 have second overlapping time td2.

In some embodiments of the disclosure, as shown in FIG. 11, the kickoff moment kcs1 of the active level (for example, a high level) of the first control signal cs1 may be earlier than a kickoff moment kcs5 of the active level (for example, a high level) of the fifth control signal cs5. Moreover, the kickoff moment kcs5 of the active level (for example, a high level) of the fifth control signal cs5 is earlier than the kickoff moment kcs2 of the active level (for example, a high level) of the second control signal cs2. In addition, the kickoff moment kcs5 of the active level (for example, a high level) of the fifth control signal cs5 is earlier than a kickoff moment kcs6 of the active level (for example, a high level) of the sixth control signal cs6. Moreover, the kickoff moment kcs2 of the active level (for example, a high level) of the second control signal cs2 is earlier than the kickoff moment kcs6 of the active level (for example, a high level) of the sixth control signal cs6.

In some embodiments of the disclosure, as shown in FIG. 11, the second control signal cs2 and the seventh control signal cs7 may have substantially the same timing.

A working process of a pixel circuit provided in an embodiment of the disclosure in one display frame is described below by taking the structure of the pixel circuit shown in FIG. 10 as an example and in combination with the signal timing chart shown in FIG. 11. The reset stage T1, the data writing stage T2 and the light emission stage T3 in the signal timing chart shown in FIG. 11 are mainly shown. The reset stage T1 includes a stage T11 and a stage T12. In addition, sign em1 represents the first light emission control signal em1 applied to the first light emission control signal terminal EM1. Sign em2 represents the second light emission control signal em2 applied to the second light emission control signal terminal EM2. Sign cs1 represents the first control signal cs1 applied to the first control signal terminal CS1. Sign cs2 represents the second control signal cs2 applied to the second control signal terminal CS2. Sign cs5 represents the fifth control signal cs5 applied to the fifth control signal terminal CS5. Sign cs6 represents the fourth control signal cs4 applied to the sixth control signal terminal CS6.

In the stage T11 of the reset stage T1, the second transistor M2 and the ninth transistor M9 are turned off under the control of the high level of the signal cs2. The sixth transistor M6 is turned off under the control of the high level of the signal cs6. The seventh transistor M7 is turned off under the control of the high level of the signal em1. The eighth transistor M8 is turned off under the control of the high level of the signal em2. The first transistor M1 is turned on under the control of the low level of the signal cs1 to provide the first initialization voltage vinit1 applied to the first initialization signal terminal VINIT1 to the control electrode of the drive transistor M0, so as to reset the control electrode of the drive transistor M0, and maintain the voltage of the control electrode of the drive transistor M0 by the storage capacitor CST. In this stage, although the fifth transistor M5 is turned on under the control of the low level of the signal cs5, the sixth transistor M6 is turned off. Therefore, a working process of the pixel circuit is not affected.

In the stage T12 of the reset stage T1, the first transistor M1 is turned off under the control of the high level of the signal cs1. The sixth transistor M6 is turned off under the control of the high level of the signal cs6. The seventh transistor M7 is turned off under the control of the high level of the signal em1. The eighth transistor M8 is turned off under the control of the high level of the signal em2. The second transistor M2 is turned on under the control of the low level of the signal cs2, so as to cause the control electrode and the second electrode of the drive transistor M0 to be connected, such that the drive transistor M0 works in a diode manner. Since the storage capacitor CST maintains the voltage of the control electrode of the drive transistor M0 at the first initialization voltage vinit1, it is possible to change the voltage of the second electrode of the drive transistor M0 into the first initialization voltage vinit1, and change the voltage of the first electrode of the drive transistor M0 into vinit1-Vth. Vth represents the threshold voltage of the drive transistor M0. In this way, the control electrode, the first electrode and the second electrode of the drive transistor M0 may be reset before the data voltage is written. After reset, the voltage of the control electrode of the drive transistor M0 is the first initialization voltage vinit1, the voltage of the second electrode changes into the first initialization voltage vinit1, and the voltage of the first electrode changes into vinit1-Vth, while the pixel circuit works in each display frame, before the data voltage is input, the voltage of the control electrode of the drive transistor M0 is substantially the same, the voltage of the first electrode of the drive transistor M0 is substantially the same, and the voltage of the second electrode of the drive transistor M0 is substantially the same, thereby solving the ghosting problem caused by a hysteresis effect during switching between a high gray scale and a low gray scale. In addition, the ninth transistor M9 is turned on under the control of the low level of the signal cs2, so as to input the second initialization voltage applied to the second initialization signal terminal VINIT 2 to the first electrode of the light emitting device L to initialize the light emitting device L. Moreover, although the fifth transistor M5 is turned on under the control of the low level of the signal cs5, the sixth transistor M6 is deactivated. Therefore, a working process of the pixel circuit is not affected.

In the data writing stage T2, the first transistor M1 is turned off under the control of the high level of the signal cs1. The seventh transistor M7 is turned off under the control of the high level of the signal em1. The eighth transistor M8 is turned off under the control of the high level of the signal em2. The second transistor M2 is turned on under the control of the low level of the signal cs2, so as to cause the control electrode and the second electrode of the drive transistor M0 to be connected, such that the drive transistor M0 works in a diode manner. The fifth transistor M5 is turned on under the control of the low level of the signal cs5, and the sixth transistor M6 is turned on under the control of the low level of the signal cs6, so as to input the data voltage Vda applied to the data signal terminal DA to the first electrode of the drive transistor M0, and the control electrode of the drive transistor M0 is charged by means of the activated second transistor M2 such that the voltage of the control electrode of the drive transistor M0 changes into Vda+Vth. Moreover, the ninth transistor M9 is turned on under the control of the low level of the signal cs2, so as to input the second initialization voltage applied to the second initialization signal terminal VINIT 2 to the first electrode of the light emitting device L to initialize the light emitting device L.

In the light emission stage T3, the first transistor M1 is turned off under the control of the high level of the signal cs1. The second transistor M2 and the ninth transistor M9 are turned off under the control of the high level of the signal cs2. The fifth transistor M5 is turned off under the control of the high level of the signal cs5. The sixth transistor M6 is turned off under the control of the high level of the signal cs6. The seventh transistor M7 is turned on under the control of the low level of the signal em1, so as to provide the first power supply voltage of the first power supply terminal VDD to the first electrode of the drive transistor M0, such that the voltage of the first electrode of the drive transistor M0 is Vdd. The voltage of the control electrode of the drive transistor M0 is Vda+Vth, and the drive current IL flowing the drive transistor M0 is: $IL=K(Vda+Vth-Vdd-Vth)^2=K(Vda-Vdd)^2$. The activated eighth transistor M8 connects the second electrode of the drive transistor M0 to the first electrode of the light emitting device L, thereby providing the drive current IL for the light emitting device L, so as to drive the light emitting device L to emit light. Here, K is a structural constant of the drive transistor M0.

It should be noted that in the T12 stage, the control electrode, the first electrode and the second electrode of the drive transistor M0 may be reset before the data voltage is written. In addition, after reset, the voltage of the control electrode of the drive transistor M0 is the first initialization voltage vinit1, the voltage of the second electrode changes into the first initialization voltage vinit1, and the voltage of the first electrode changes into vinit1-Vth, while the pixel circuit works in each display frame, before the data voltage is input, the voltage of the control electrode of the drive transistor M0 is substantially the same, the voltage of the first electrode of the drive transistor M0 is substantially the same, and the voltage of the second electrode of the drive transistor M0 is substantially the same, thereby solving the ghosting problem caused by a hysteresis effect during switching between a high gray scale and a low gray scale.

It should be noted that in the light emission stage T3, the drive current IL for driving the light emitting device L to emit light is independent of the threshold voltage of the drive transistor M0 according to the formula $IL=K(Vda+Vth-Vdd-Vth)^2=K(Vda-Vdd)^2$. As such, the influence of a threshold voltage shift of the drive transistor M0 on light emission of the light emitting device L may be avoided, and light emission stability may be further improved.

It should be noted that a buffer stage T4 may be further provided between the data writing stage T2 and the light emission stage T3. In the buffer stage T4, the voltage Vda+Vth of the drive transistor M0 can be further stabilized, before the light emission stage T3.

Figure 12:
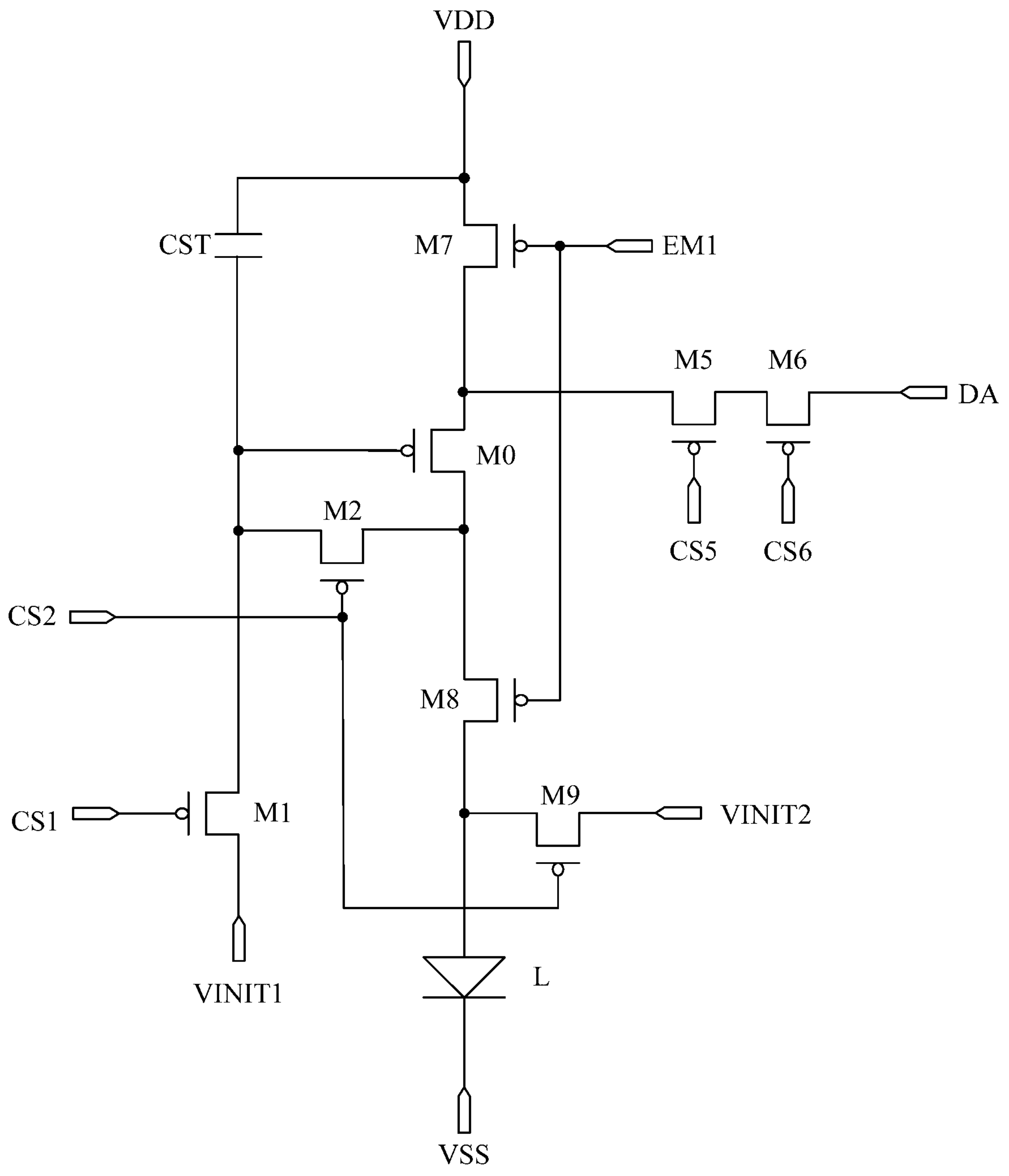
FIG. 12 shows a specific schematic structural diagram of a pixel circuit according to an embodiment of the disclosure.

An embodiment of the disclosure provides still some other schematic structural diagrams of the pixel circuit, as shown in FIG. 12, which is a variation of an implementation in the above embodiment. Only the differences between the embodiment and the above embodiment will be described below, and the similarities will not be repeated herein.

In some embodiments of the disclosure, the first light emission control signal terminal and the second light emission control signal terminal may be set as the same signal terminal. In this way, the number of signal traces may be decreased to reduce wiring difficulty. In some embodiments, as shown in FIG. 12, the control electrode of the seventh transistor M7 and the control electrode of the eighth transistor M8 both may be coupled to the first light emission control signal terminal EM1. Alternatively, the control electrode of the seventh transistor M7 and the control electrode of the eighth transistor M8 both may be coupled to the second light emission control signal terminal EM2.

Figure 13A:
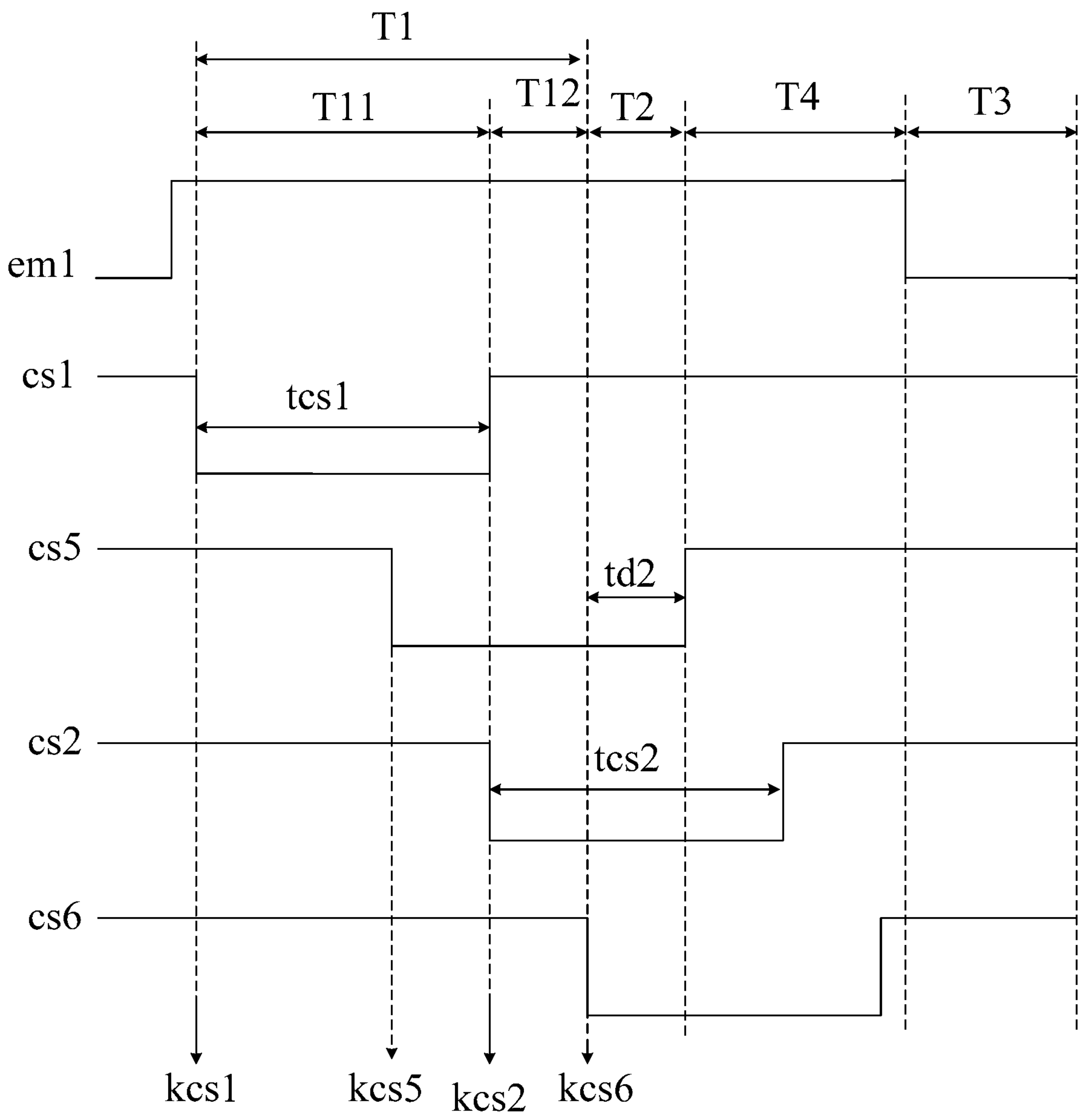
FIG. 13A shows a timing chart of signals according to an embodiment of the disclosure.

It should be noted that a signal timing chart corresponding to the pixel circuit shown in FIG. 12 may be as shown in FIG. 13A. In addition, a process of the pixel circuit shown in FIG. 12 working in combination with signal timing shown in FIG. 13A may be substantially the same as a process of the pixel circuit shown in FIG. 10 working in combination with signal timing shown in FIG. 11, and will not be repeated herein.

Figure 13B:
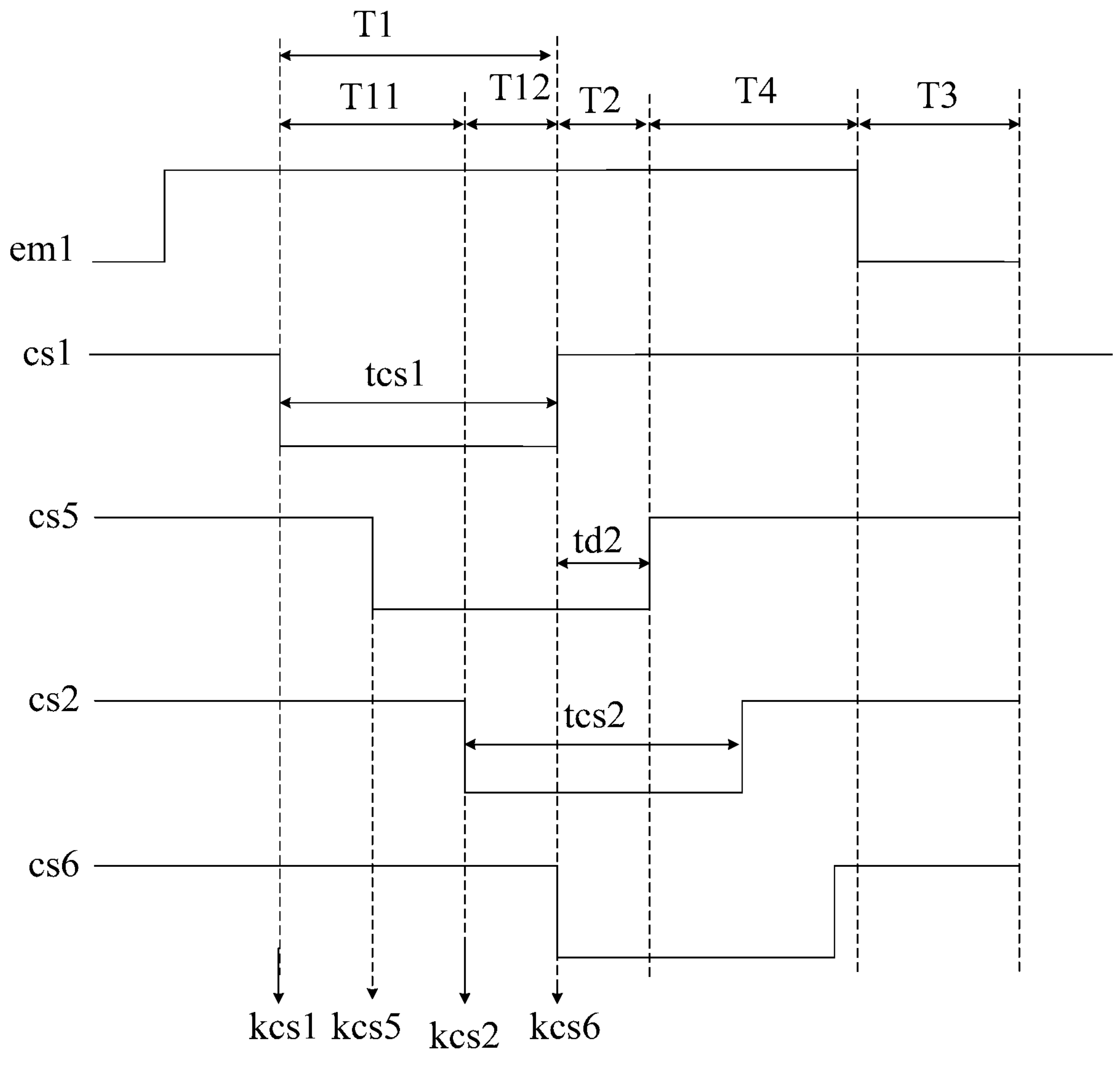
FIG. 13B shows a timing chart of signals according to an embodiment of the disclosure.

It should be noted that a signal timing chart corresponding to the pixel circuit shown in FIG. 12 may be as shown in FIG. 13B. In addition, a process of the pixel circuit shown in FIG. 12 working in combination with signal timing shown in FIG. 13B may be substantially the same as a process of the pixel circuit shown in FIG. 10 working in combination with signal timing shown in FIG. 11, and will not be repeated herein.

Figure 14:
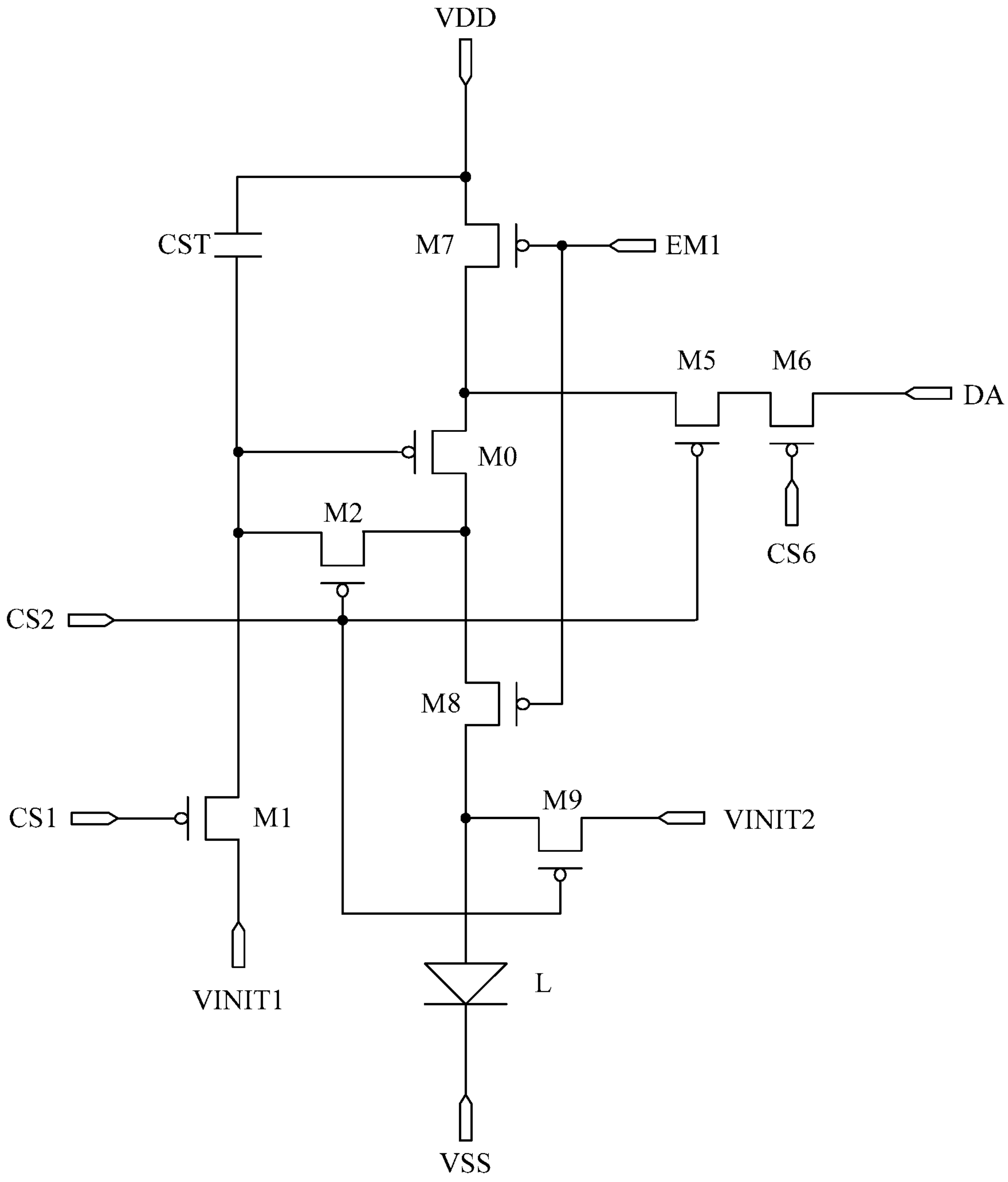
FIG. 14 shows a specific schematic structural diagram of a pixel circuit according to an embodiment of the disclosure.

An embodiment of the disclosure provides still some other schematic structural diagrams of the pixel circuit, as shown in FIG. 14, which is a variation of an implementation in the above embodiment. Only the differences between the embodiment and the above embodiment will be described below, and the similarities will not be repeated herein.

In some embodiments of the disclosure, the fifth control signal terminal and the second control signal terminal may be set as the same signal terminal. The seventh control signal terminal CS7 and the second control signal terminal CS2 are set as the same signal terminal. Moreover, the first light emission control signal terminal EM1 and the second light emission control signal terminal EM2 may be set as the same signal terminal. In this way, the number of signal traces may be decreased to reduce wiring difficulty. In some embodiments, as shown in FIG. 14, the control electrode of the seventh transistor M7 and the control electrode of the eighth transistor M8 both may be coupled to the first light emission control signal terminal EM1. The control electrode of the second transistor M2, the control electrode of the fifth transistor M5, and the control electrode of the ninth transistor M9 all may be coupled to the second control signal terminal CS2.

Figure 15:
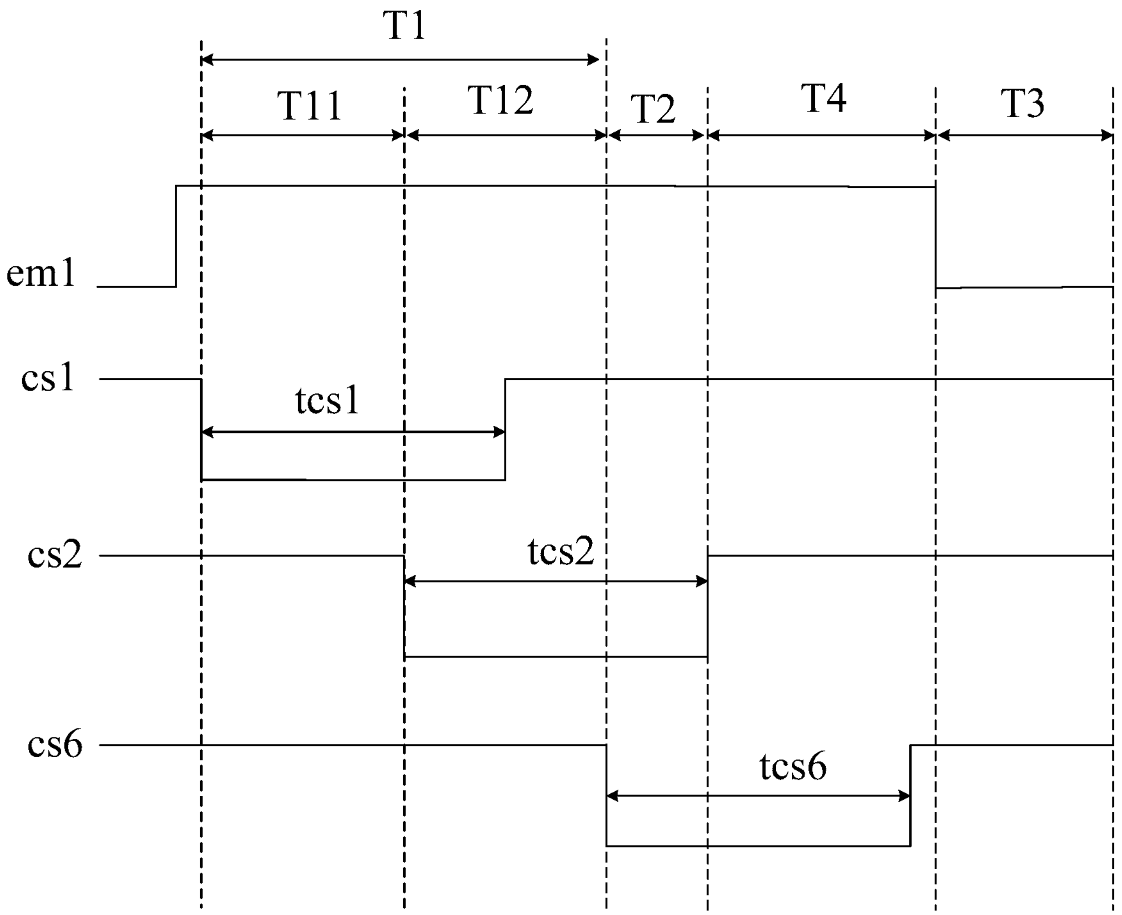
FIG. 15 shows a timing chart of signals according to an embodiment of the disclosure.

In some embodiments of the disclosure, as shown in FIG. 15, the duration tcs1 of the active level (for example, a high level) of the first control signal cs1, the duration tcs2 of the active level (for example, a high level) of the second control signal cs2, and the duration tcs6 of the active level (for example, a high level) of the sixth control signal cs6 may be substantially the same. In addition, the kickoff moment of the duration tcs1 of the active level (for example, a high level) of the first control signal cs1 is earlier than the kickoff moment of the duration tcs2 of the active level (for example, a high level) of the second control signal cs2. Moreover, the kickoff moment of the duration tcs2 of the active level (for example, a high level) of the second control signal cs2 is earlier than the kickoff moment of the duration tcs6 of the active level (for example, a high level) of the sixth control signal cs6.

A working process of a pixel circuit provided in an embodiment of the disclosure in one display frame is described below by taking the structure of the pixel circuit shown in FIG. 14 as an example and in combination with a signal timing chart shown in FIG. 15. The reset stage T1, the data writing stage T2 and the light emission stage T3 in the signal timing chart shown in FIG. 15 are mainly shown. The reset stage T1 includes a stage T11 and a stage T12. In addition, sign em1 represents the first light emission control signal em1 applied to the first light emission control signal terminal EM1. Sign em2 represents the second light emission control signal em2 applied to the second light emission control signal terminal EM2. Sign cs1 represents the first control signal cs1 applied to the first control signal terminal CS1. Sign cs2 represents the second control signal cs2 applied to the second control signal terminal CS2. Sign cs6 represents the sixth control signal cs6 applied to the sixth control signal terminal CS6. Sign cs7 represents the seventh control signal cs7 applied to the seventh control signal terminal CS7.

In the stage T11 of the reset stage T1, the second transistor M2, the fifth transistor M5, and the ninth transistor M9 are turned off under the control of the high level of the signal cs2. The sixth transistor M6 is turned off under the control of the high level of the signal cs6. The seventh transistor M7 and the eighth transistor M8 are turned off under the control of the high level of the signal em1. The first transistor M1 is turned on under the control of the low level of the signal cs1 to provide the first initialization voltage vinit1 applied to the first initialization signal terminal VINIT1 to the control electrode of the drive transistor M0, so as to reset the control electrode of the drive transistor M0, and maintain the voltage of the control electrode of the drive transistor M0 by the storage capacitor CST.

In the stage T12 of the reset stage T1, the first transistor M1 is turned off under the control of the high level of the signal cs1. The sixth transistor M6 is turned off under the control of the high level of the signal cs6. The seventh transistor M7 and the eighth transistor M8 are turned off under the control of the high level of the signal em1. The second transistor M2 is turned on under the control of the low level of the signal cs2, so as to cause the control electrode and the second electrode of the drive transistor M0 to be connected, such that the drive transistor M0 works in a diode manner. Since the storage capacitor CST maintains the voltage of the control electrode of the drive transistor M0 at the first initialization voltage vinit1, it is possible to change the voltage of the second electrode of the drive transistor M0 into the first initialization voltage vinit1, and change the voltage of the first electrode of the drive transistor M0 into vinit1-Vth. Vth represents the threshold voltage of the drive transistor M0. In this way, the control electrode, the first electrode and the second electrode of the drive transistor M0 may be reset before the data voltage is written. After reset, the voltage of the control electrode of the drive transistor M0 is the first initialization voltage vinit1, the voltage of the second electrode changes into the first initialization voltage vinit1, and the voltage of the first electrode changes into vinit1-Vth, while the pixel circuit works in each display frame, before the data voltage is input, the voltage of the control electrode of the drive transistor M0 is substantially the same, the voltage of the first electrode of the drive transistor M0 is substantially the same, and the voltage of the second electrode of the drive transistor M0 is substantially the same, thereby solving the ghosting problem caused by a hysteresis effect during switching between a high gray scale and a low gray scale. In addition, the ninth transistor M9 is turned on under the control of the low level of the signal cs2, so as to input the second initialization voltage applied to the second initialization signal terminal VINIT 2 to the first electrode of the light emitting device L to initialize the light emitting device L. Moreover, although the fifth transistor M5 is turned on under the control of the low level of the signal cs2, the sixth transistor M6 is deactivated. Therefore, a working process of the pixel circuit is not affected.

In the data writing stage T2, the first transistor M1 is turned off under the control of the high level of the signal cs1. The seventh transistor M7 and the eighth transistor M8 are turned off under the control of the high level of the signal em1. The second transistor M2 is turned on under the control of the low level of the signal cs2, so as to cause the control electrode and the second electrode of the drive transistor M0 to be connected, such that the drive transistor M0 works in a diode manner. The fifth transistor M5 is turned on under the control of the low level of the signal cs2, and the sixth transistor M6 is turned on under the control of the low level of the signal cs6, so as to input the data voltage Vda applied to the data signal terminal DA to the first electrode of the drive transistor M0, and the control electrode of the drive transistor M0 is charged by means of the activated second transistor M2 such that the voltage of the control electrode of the drive transistor M0 changes into Vda+Vth. Moreover, the ninth transistor M9 is turned on under the control of the low level of the signal cs2, so as to input the second initialization voltage applied to the second initialization signal terminal VINIT 2 to the first electrode of the light emitting device L to initialize the light emitting device L.

In the light emission stage T3, the first transistor M1 is turned off under the control of the high level of the signal cs1. The second transistor M2, the fifth transistor M5 and the ninth transistor M9 are turned off under the control of the high level of the signal cs2. The sixth transistor M6 is turned off under the control of the high level of the signal cs6. The seventh transistor M7 is turned on under the control of the low level of the signal em1, so as to provide the first power supply voltage of the first power supply terminal VDD to the first electrode of the drive transistor M0, such that the voltage of the first electrode of the drive transistor M0 is Vdd. Since the voltage of the control electrode of the drive transistor M0 is Vda+Vth, the drive current IL flowing the drive transistor M0 is: $IL=K(Vda+Vth-Vdd-Vth)^2=K(Vda-Vdd)^2$. The activated eighth transistor M8 connects the second electrode of the drive transistor M0 to the first electrode of the light emitting device L, thereby providing the drive current IL for the light emitting device L, so as to drive the light emitting device L to emit light. In addition, K is a structural constant of the drive transistor M0.

It should be noted that in the T12 stage, the control electrode, the first electrode and the second electrode of the drive transistor M0 may be reset before the data voltage is written. After reset, the voltage of the control electrode of the drive transistor M0 is the first initialization voltage vinit1, the voltage of the second electrode changes into the first initialization voltage vinit1, and the voltage of the first electrode changes into vinit1-Vth, while the pixel circuit works in each display frame, before the data voltage is input, the voltage of the control electrode of the drive transistor M0 is substantially the same, the voltage of the first electrode of the drive transistor M0 is substantially the same, and the voltage of the second electrode of the drive transistor M0 is substantially the same, thereby solving the ghosting problem caused by a hysteresis effect during switching between a high gray scale and a low gray scale.

It should be noted that in the light emission stage T3, the drive current IL for driving the light emitting device L to emit light is independent of the threshold voltage of the drive transistor M0 according to the formula $IL=K(Vda+Vth-Vdd-Vth)^2=K(Vda-Vdd)^2$. As such, the influence of a threshold voltage shift of the drive transistor M0 on light emission of the light emitting device L may be avoided, and light emission stability may be further improved.

It should be noted that a buffer stage T4 may be further provided between the data writing stage T2 and the light emission stage T3. In the buffer stage T4, the voltage Vda+Vth of the drive transistor M0 is further stabilized, before the light emission stage T3.

Figure 16:
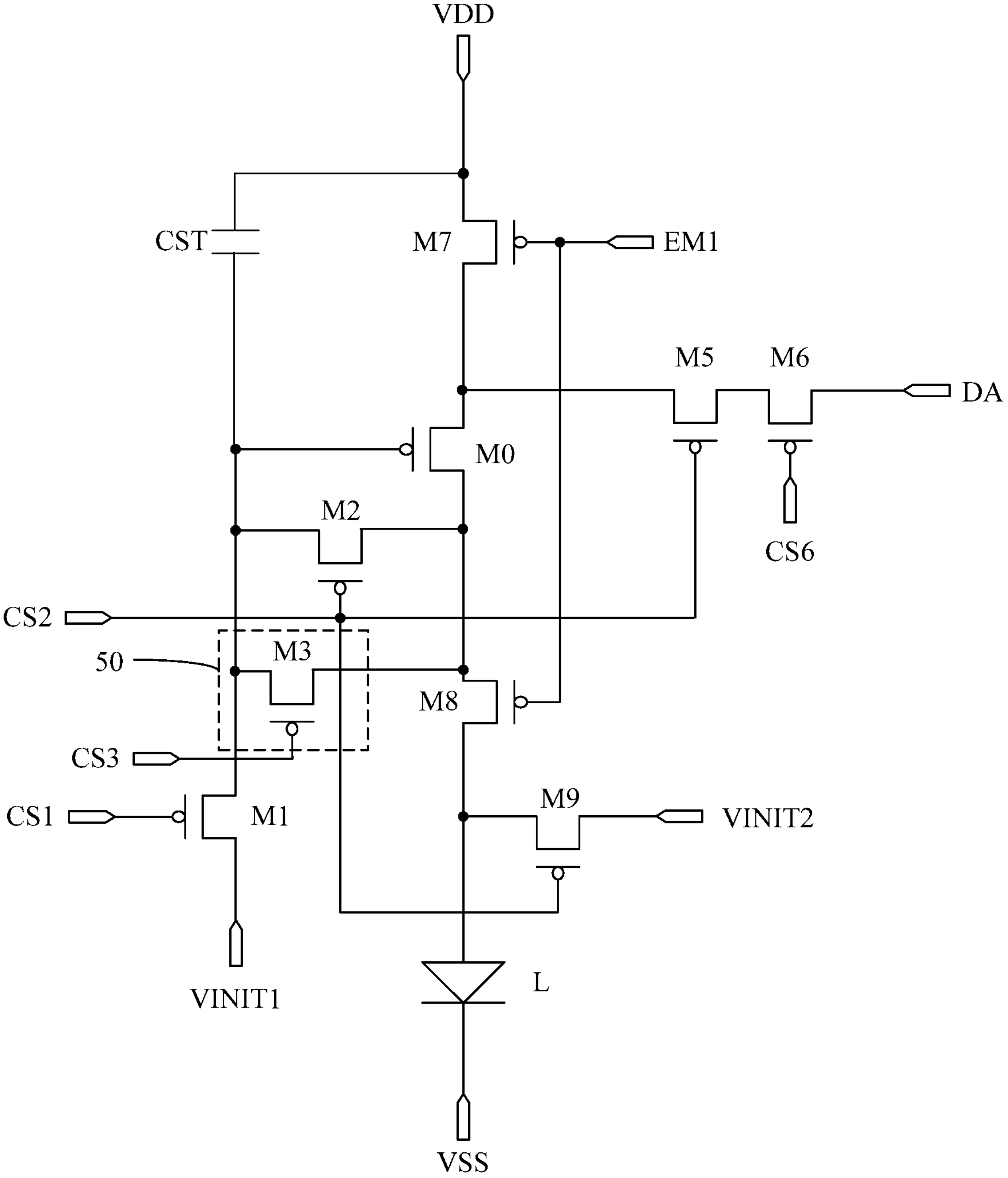
FIG. 16 shows a specific schematic structural diagram of a pixel circuit according to an embodiment of the disclosure.

An embodiment of the disclosure provides still some other schematic structural diagrams of the pixel circuit, as shown in FIG. 16, which is a variation of an implementation mode in the above embodiment. Only the differences between the embodiment and the above embodiment will be described below, and the similarities will not be repeated herein.

In some embodiments of the disclosure, the pixel circuit may further include a threshold compensation circuit 50. In addition, the threshold compensation circuit 50 is coupled to the drive transistor M0, and the threshold compensation circuit 50 is configured to compensate, when the data voltage is input, the threshold voltage of the drive transistor M0 in response to a third control signal cs3 applied to a third control signal terminal CS3. In some embodiments, the threshold compensation circuit 50 may include: a third transistor M3. A control electrode of the third transistor M3 is coupled to the third control signal terminal CS3, a first electrode of the third transistor M3 is coupled to the control electrode of the drive transistor M0, and a second electrode of the third transistor M3 is coupled to the second electrode of the drive transistor M0. In some embodiments, the third transistor M3 is turned on under the control of the active level of the third control signal cs3 and turned off under the control of the inactive level of the third control signal cs3. For example, the third transistor M3 is a P-type transistor, an active level of the third control signal cs3 is a low level, and an inactive level thereof is a high level. Alternatively, high level, and an inactive level thereof is a low level.

Figure 17:
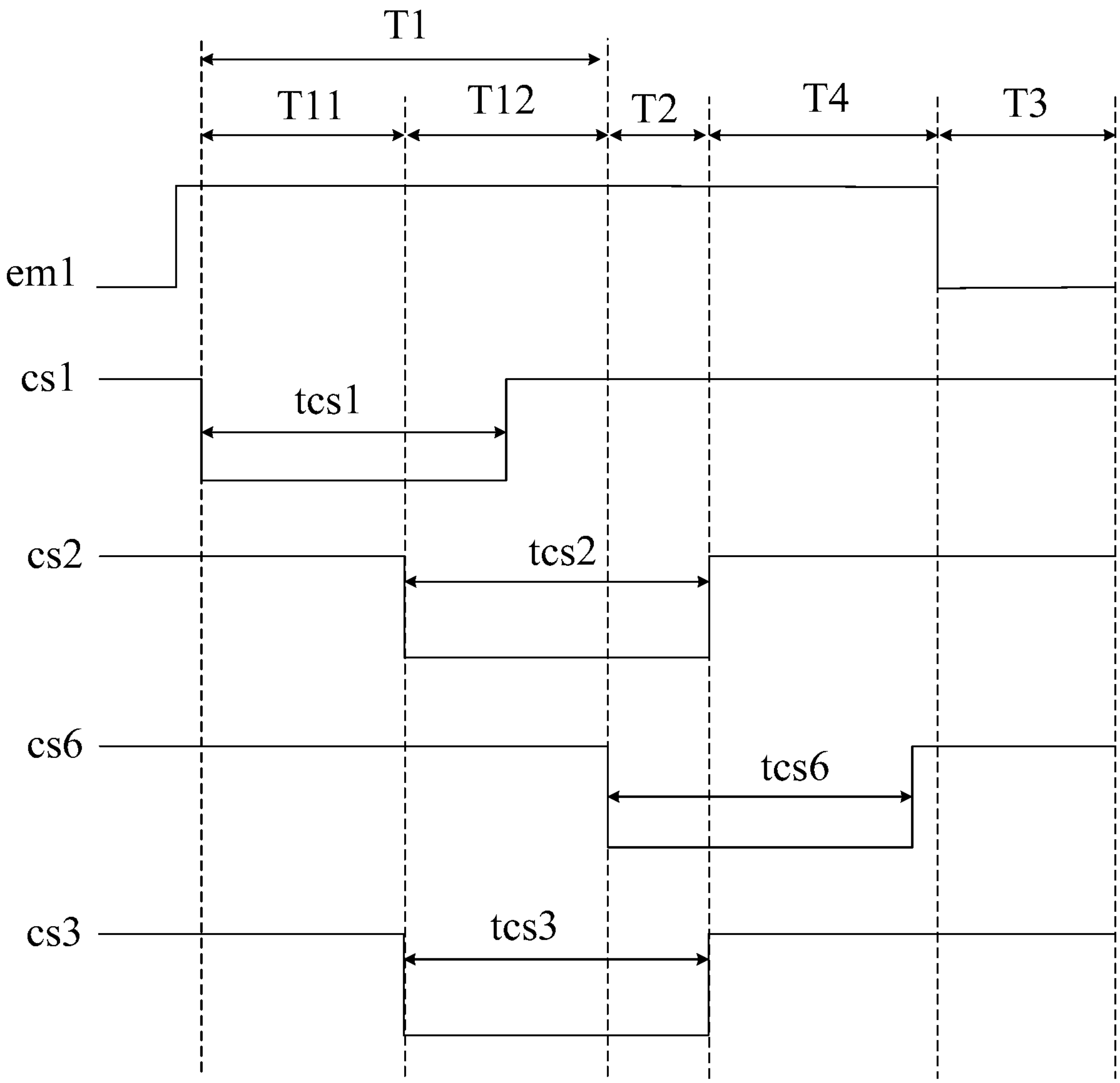
FIG. 17 shows a timing chart of signals according to an embodiment of the disclosure.

It should be noted that a signal timing chart corresponding to the pixel circuit shown in FIG. 16 may be as shown in FIG. 17. In addition, a process of the pixel circuit shown in FIG. 16 working in combination with signal timing shown in FIG. 17 may be substantially the same as a process of the pixel circuit shown in FIG. 14 working in combination with signal timing shown in FIG. 15, and will not be repeated herein.

At least one sub-pixel (for example, each sub-pixel) in the display panel provided in an embodiment of the disclosure may include any one of the above pixel circuits provided in embodiments of the disclosure. In addition, the display panel may further include a plurality of control signal lines and a drive and control circuit. At least one of the plurality of control signal lines is coupled to a pixel circuit in a row of sub-pixels, and the drive and control circuit is coupled to the plurality of control signal lines.

Figure 18:
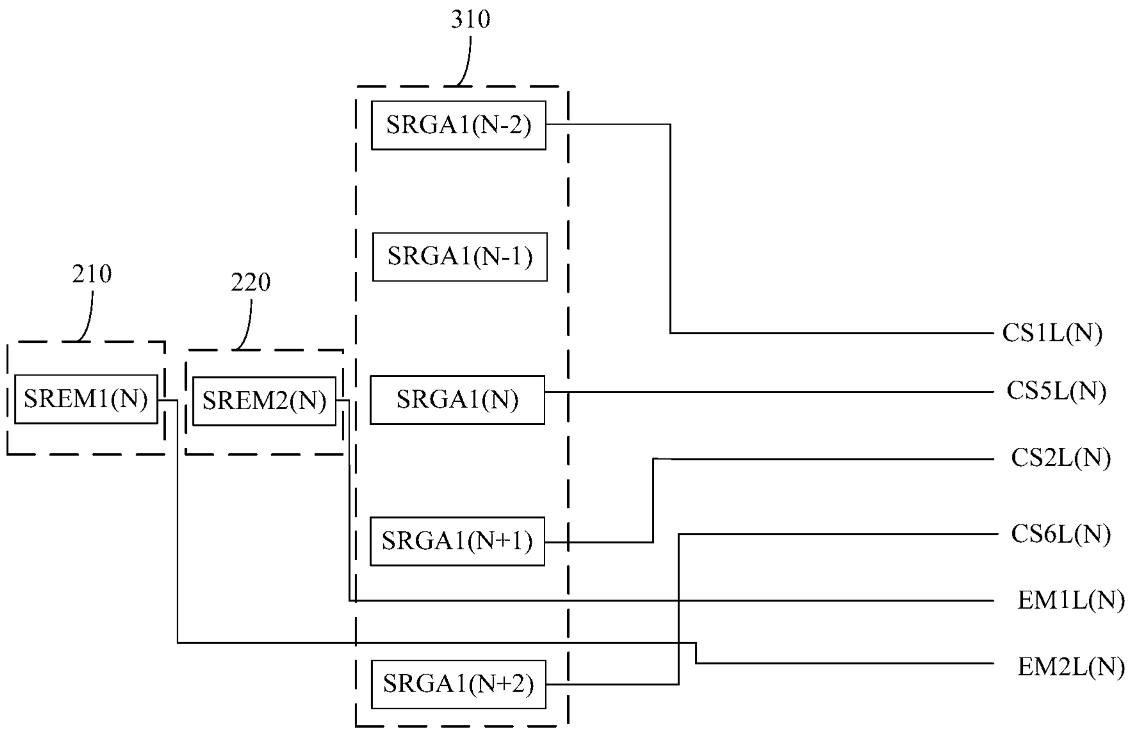
FIG. 18 shows a schematic structural diagram of a display panel according to an embodiment of the disclosure.

In some embodiments of the disclosure, under the condition that the first light emission control signal terminal EM1 and the second light emission control signal terminal EM2 of the same pixel circuit are mutually independent signal terminals, and the pixel circuit shown in FIG. 10 is used in the display panel, as shown in FIG. 18, the plurality of control signal lines include a plurality of first light emission control signal lines, a plurality of second light emission control signal lines, a plurality of first control signal lines, a plurality of second control signal lines, a plurality of fifth control signal lines and a plurality of sixth control signal lines. One of the first control signal lines is coupled to a first control signal terminal CS1 of a pixel circuit in a row of sub-pixels, one of the second control signal lines is coupled to a second control signal terminal CS2 of a pixel circuit in a row of sub-pixels, one of the fifth control signal lines is coupled to a fifth control signal terminal CS5 of a pixel circuit in a row of sub-pixels, one of the sixth control signal lines is coupled to a sixth control signal terminal CS6 of a pixel circuit in a row of sub-pixels, one of the first light emission control signal lines is coupled to a first light emission control signal terminal EM1 of a pixel circuit in a row of sub-pixels, and one of the second light emission control signal lines is coupled to a second light emission control signal terminal EM2 of a pixel circuit in a row of sub-pixels.

In some embodiments of the disclosure, as shown in FIG. 18, the drive and control circuit may be arranged in a non-display region, and the drive and control circuit may include: a first light emission control circuit 210, a second light emission control circuit 220, and a first driving control circuit 310. The first light emission control circuit 210 includes a plurality of first shift register units for light emission control sequentially arranged, and one first shift register unit for light emission control is coupled to the first light emission control signal line coupled to a row of sub-pixels. The second light emission control circuit 220 includes a plurality of second shift register units for light emission control sequentially arranged, and one second shift register unit for light emission control is coupled to the second light emission control signal line coupled to a row of sub-pixels. The first driving control circuit 310 includes a plurality of first driving shift register units sequentially arranged; a plurality of first driving shift register units adjacent to each other serve as a first unit group, and a row of sub-pixels correspond to one first unit group; and in the first unit group, a first one of first driving shift register units is coupled to a first control signal line coupled to a corresponding row of sub-pixels, a third one of first driving shift register units is coupled to a fifth control signal line coupled to a corresponding row of sub-pixels, a fourth one of first driving shift register units is coupled to a second control signal line coupled to a corresponding row of sub-pixels, and a fifth one of first driving shift register units is coupled to a sixth control signal line coupled to a corresponding row of sub-pixels.

In some embodiments, with every five adjacent first driving shift register units serving as a first unit group as an example, as shown in FIG. 18, five adjacent first driving shift register units in the first driving control circuit 310: an (N−2)th first driving shift register unit SRGA2(N−2)—an (N+2)th first driving shift register unit SRGA2(N+2), an Nth first shift register unit for light emission control SREM1(N) in the first light emission control circuit 210, and an Nth second shift register unit for light emission control SREM2 (N) in the second light emission control circuit 220 are illustrated. The Nth first shift register unit for light emission control SREM1(N) in the first light emission control circuit 210 is coupled to a first light emission control signal line EM1L(N) corresponding to an Nth row of sub-pixels. The Nth second shift register unit for light emission control SREM2(N) in the second light emission control circuit 220 is coupled to a second light emission control signal line EM2L(N) corresponding to the Nth row of sub-pixels. The (N−2)th first driving shift register unit SRGA2(N−2) in the first driving control circuit 310 is coupled to a first control signal line CS1L(N) corresponding to the Nth row of sub-pixels. The Nth first driving shift register unit SRGA2 (N) in the first driving control circuit 310 is coupled to a fifth control signal line CS5L(N) corresponding to the Nth row of sub-pixels. The (N+1)th first driving shift register unit SRGA2(N+1) in the first driving control circuit 310 is coupled to a second control signal line CS2L(N) corresponding to the Nth row of sub-pixels. The (N+2)th first driving shift register unit SRGA2(N+2) in the first driving control circuit 310 is coupled to a sixth control signal line CS6L(N) corresponding to the Nth row of sub-pixels.

It should be noted that six, seven or more first driving shift register units are arranged in the first unit group. During practical application, the number of the first driving shift register units in the first unit group may be determined according to practical applications, and a correspondence relation between the first driving shift register units in the first unit group and a corresponding row of control signal lines only is required to satisfy a relation in the above timing chart.

Figure 19:
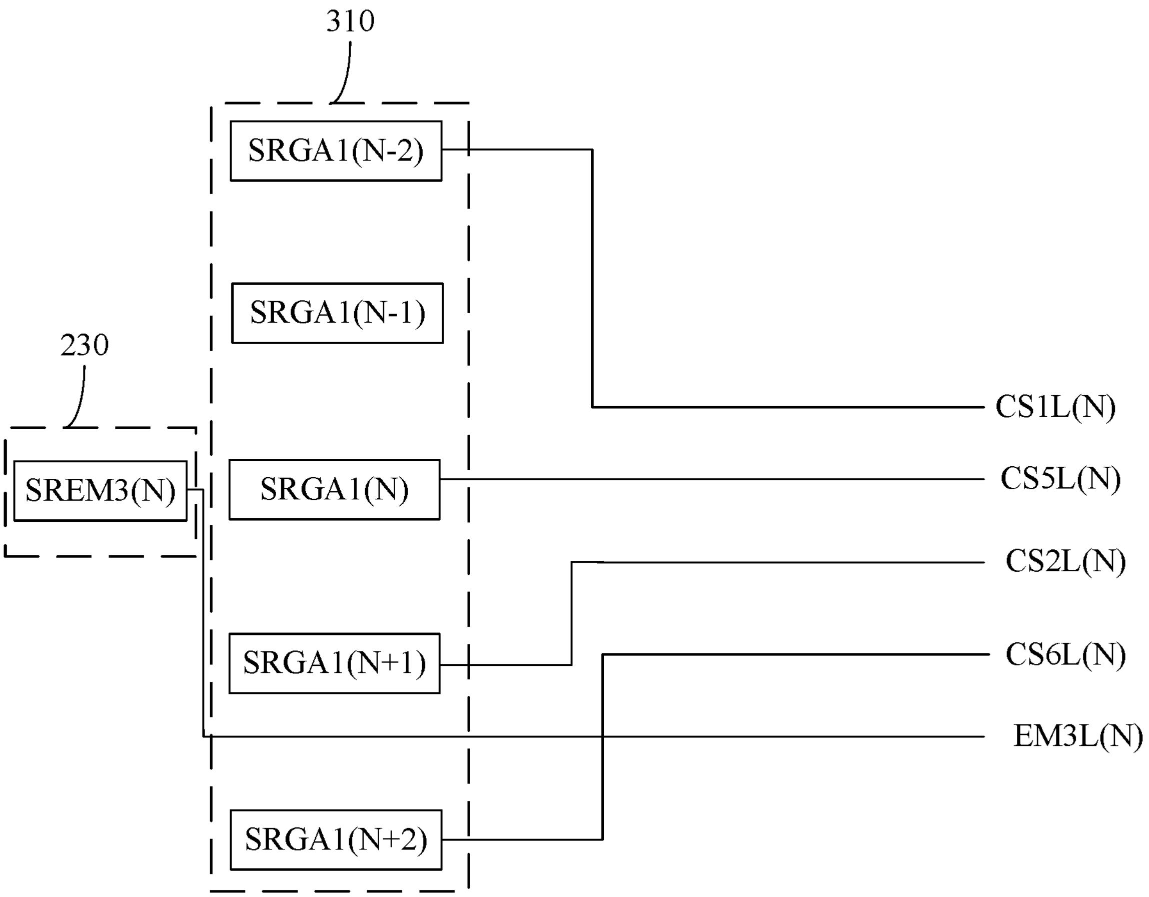
FIG. 19 shows a schematic structural diagram of a display panel according to an embodiment of the disclosure.

An embodiment of the disclosure provides some other schematic structural diagrams of a display panel, as shown in FIG. 19, which is a variation of an implementation mode in the above embodiment. Only the differences between the embodiment and the above embodiment will be described below, and the similarities will not be repeated herein.

In some embodiments of the disclosure, under the condition that the first emission control signal terminal EM1 and the second emission control signal terminal EM2 of the same pixel circuit are the same signal terminal, for example, under the condition that the pixel circuit shown in FIG. 12 is used in the display panel, as shown in FIG. 19, a plurality of control signal lines may include a plurality of third emission control signal lines, and one third light emission control signal line is coupled to a first light emission control signal terminal EM1 and a second light emission control signal terminal EM2 of a pixel circuit in a row of sub-pixels. In addition, the drive and control circuit includes a third light emission control circuit 230, the third light emission control circuit 230 includes a plurality of third shift register units for light emission control sequentially arranged, and one third shift register unit for light emission control is coupled to a third light emission control signal line coupled to a row of sub-pixels.

In some embodiments, with every five adjacent first driving shift register units serving as a first unit group as an example, as shown in FIG. 19, five adjacent first driving shift register units in the first driving control circuit 310: an (N−2)th first driving shift register unit SRGA1(N−2)—an (N+2)th first driving shift register unit SRGA1(N+2), an Nth third shift register unit for light emission control SREM3(N) in the third light emission control circuit 230 are illustrated. The Nth third shift register unit for light emission control SREM3(N) in the third light emission control circuit 230 is coupled to a third light emission control signal line EM3L (N) corresponding to an Nth row of sub-pixels. The (N−2)th first driving shift register unit SRGA1(N−2) in the first driving control circuit 310 is coupled to a first control signal line CS1L(N) corresponding to the Nth row of sub-pixels. The Nth first driving shift register unit SRGA1(N) in the first driving control circuit 310 is coupled to a fifth control signal line CS5L(N) corresponding to the Nth row of sub-pixels. The (N+1)th first driving shift register unit SRGA1(N+1) in the first driving control circuit 310 is coupled to a second control signal line CS2L(N) corresponding to the Nth row of sub-pixels. The (N+2)th first driving shift register unit SRGA1(N+2) in the first driving control circuit 310 is coupled to a sixth control signal line CS6L(N) corresponding to the Nth row of sub-pixels.

It should be noted that six, seven or more first driving shift register units are arranged in the first unit group. During practical application, the number of the first driving shift register units in the first unit group may be determined according to practical applications, and a correspondence relation between the first driving shift register units in the first unit group and a corresponding row of control signal lines only is required to satisfy a relation in the above timing chart.

Figure 20:
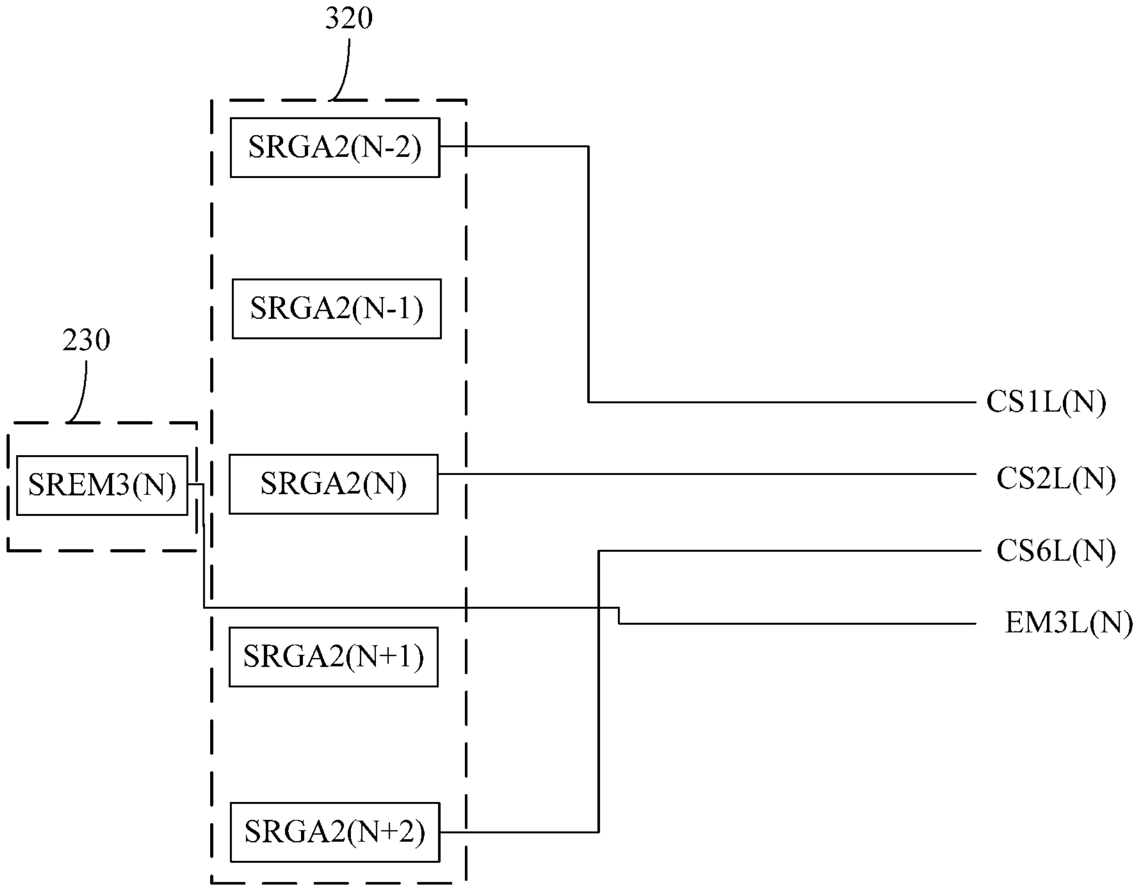
FIG. 20 shows a schematic structural diagram of a display panel according to an embodiment of the disclosure.

An embodiment of the disclosure provides yet some other schematic structural diagrams of a display panel, as shown in FIG. 20, which is a variation of an implementation mode in the above embodiment. Only the differences between the embodiment and the above embodiment will be described below, and the similarities will not be repeated herein.

In some embodiments of the disclosure, under the condition that the first emission control signal terminal EM1 and the second emission control signal terminal EM2 of the same pixel circuit are the same signal terminal, for example, under the condition that the pixel circuit shown in FIG. 14 is used in the display panel, as shown in FIG. 20, the plurality of control signal lines may include a plurality of third emission control signal lines, a plurality of first control signal lines, a plurality of second control signal lines, and a plurality of sixth control signal lines. One of the third light emission control signal lines is coupled to a first light emission control signal terminal EM1 and a second light emission control signal terminal EM2 of a pixel circuit in a row of sub-pixels, one of the first control signal lines is coupled to a first control signal terminal CS1 of a pixel circuit in a row of sub-pixels, one of the second control signal lines is coupled to a second control signal terminal CS2 and a fifth control signal terminal CS5 of a pixel circuit in a row of sub-pixels, and one of the sixth control signal lines is coupled to a sixth control signal terminals CS6 of a pixel circuit in a row of sub-pixels.

In some embodiments of the disclosure, as shown in FIG. 20, the drive and control circuit includes a third light emission control circuit 230 and a second driving control circuit 320. The third light emission control circuit 230 includes a plurality of third shift register units for light emission control sequentially arranged, and one third shift register unit for light emission control is coupled to the third light emission control signal line coupled to a row of sub-pixels. The second driving control circuit 320 includes a plurality of second driving shift register units sequentially arranged; a plurality of second driving shift register units adjacent to each other serve as a second unit group, and a row of sub-pixels correspond to one second unit group. In the second unit group, a first one of second driving shift register units is coupled to a first control signal line coupled to a corresponding row of sub-pixels, a third one of second driving shift register units is coupled to a second control signal line coupled to a corresponding row of sub-pixels, and a fifth one of second driving shift register units is coupled to a sixth control signal line coupled to a corresponding row of sub-pixels.

In some embodiments, with every five adjacent second driving shift register units serving as a second unit group as an example, as shown in FIG. 20, five adjacent second driving shift register units in the second driving control circuit 320: an (N−2)th second driving shift register units SRGA2(N−2)—an (N+2)th second driving shift register units SRGA2(N+2), and an Nth third shift register unit for light emission control SREM3(N) in the third light emission control circuit 230 are illustrated. The Nth third shift register unit for light emission control SREM3(N) in the third light emission control circuit 230 is coupled to a third light emission control signal line EM3L(N) corresponding to an Nth row of sub-pixels. The (N−2)th second driving shift register unit SRGA2(N−2) in the second driving control circuit 320 is coupled to a first control signal line CS1L(N) corresponding to the Nth row of sub-pixels. The Nth second driving shift register unit SRGA2(N) in the second driving control circuit 320 is coupled to a second control signal line CS2L(N) corresponding to the Nth row of sub-pixels. The (N+2)th second driving shift register unit SRGA2(N+2) in the second driving control circuit 320 is coupled to a sixth control signal line CS6L(N) corresponding to the Nth row of sub-pixels.

It should be noted that six, seven or more second driving shift register units are arranged in the second unit group. During practical application, the number of the second driving shift register units in the second unit group may be determined according to practical applications, and a correspondence relation between the second driving shift register units in the second unit group and a corresponding row of control signal lines only is required to satisfy a relation in the above timing chart.

Figure 21:
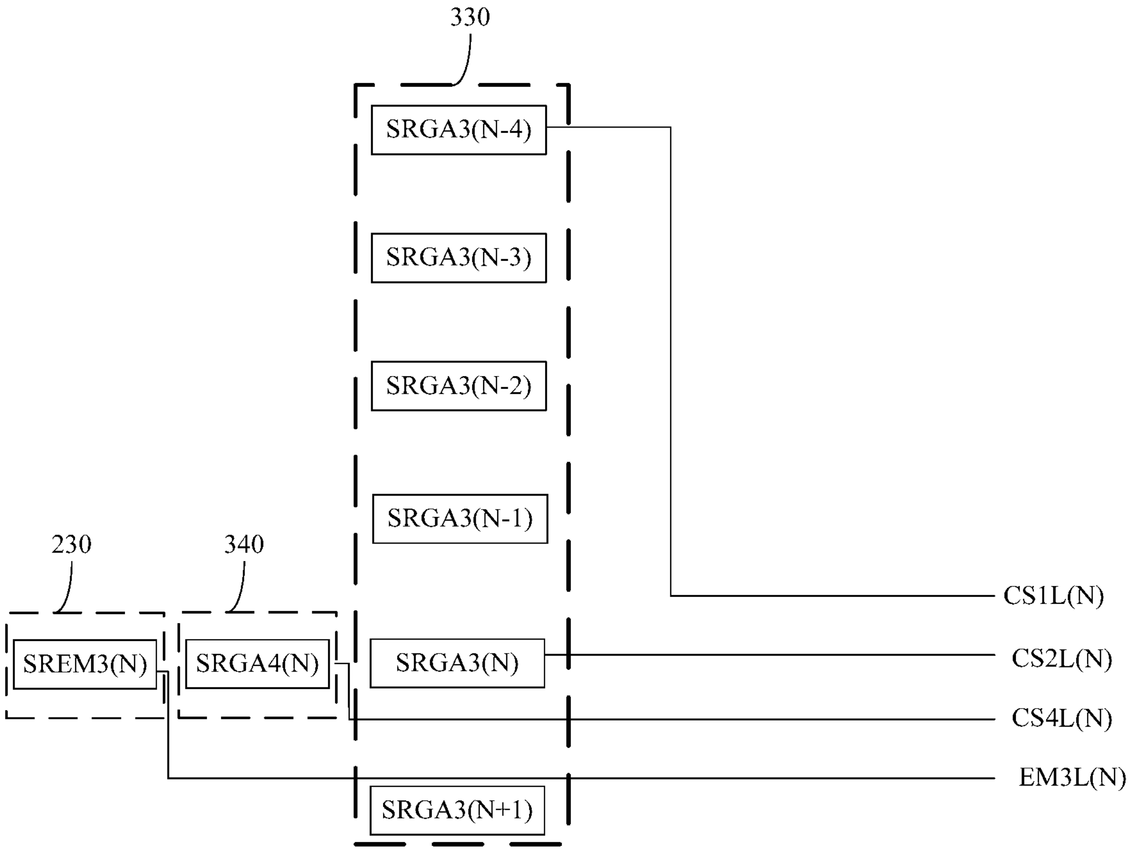
FIG. 21 shows a schematic structural diagram of a display panel according to an embodiment of the disclosure.

An embodiment of the disclosure provides still some other schematic structural diagrams of a display panel, as shown in FIG. 21, which is a variation of an implementation mode in the above embodiment. Only the differences between the embodiment and the above embodiment will be described below, and the similarities will not be repeated herein.

In some embodiments of the disclosure, under the condition that the first light emission control signal terminal EM1 and the second light emission control signal terminal EM2 of the same pixel circuit are the same signal terminal, for example, under the condition that the pixel circuit shown in FIG. 7 is used in the display panel, as shown in FIG. 21, the plurality of control signal lines may include a plurality of third light emission control signal lines, a plurality of first control signal lines, a plurality of second control signal lines, and a plurality of fourth control signal lines. One of the third light emission control signal lines is coupled to a first light emission control signal terminal EM1 and a second light emission control signal terminal EM2 of a pixel circuit in a row of sub-pixels, one of the first control signal lines is coupled to a first control signal terminal CS1 of a pixel circuit in a row of sub-pixels, one of the second control signal lines is coupled to a second control signal terminal CS2 of a pixel circuit in a row of sub-pixels, and one of the fourth control signal lines is coupled to a fourth control signal terminal CS4 of a pixel circuit in a row of sub-pixels.

In some embodiments of the disclosure, as shown in FIG. 21, the drive and control circuit includes a third light emission control circuit 230, a third driving control circuit 330 and a fourth driving control circuit 340. The third light emission control circuit 230 includes a plurality of third shift register units for light emission control sequentially arranged; and one third shift register unit for light emission control is coupled to a third light emission control signal line coupled to a row of sub-pixels. Moreover, the third driving control circuit 330 includes a plurality of third driving shift register units sequentially arranged; a plurality of third driving shift register units adjacent to each other are taken as a third unit group, and a row of sub-pixels correspond to one third unit group. In the third unit group, a first one of third driving shift register units is coupled to a first control signal line coupled to a corresponding row of sub-pixels, and a fifth one of third driving shift register units is coupled to a second control signal line coupled to a corresponding row of sub-pixels. The fourth driving control circuit 340 includes a plurality of fourth driving shift register units sequentially arranged; a row of sub-pixels correspond to one fourth driving shift register unit; and the fourth driving shift register unit is coupled to a fourth control signal line coupled to the corresponding row of sub-pixels.

In some embodiments, with every five adjacent third driving shift register units serving as a third unit group as an example, as shown in FIG. 21, five adjacent third driving shift register units in the third driving control circuit 330: an (N−4)th third driving shift register units SRGA3(N−4)—an (N+1)th third driving shift register units SRGA3(N+1), a fourth driving shift register unit SRGA4(N) in a fourth driving control circuit 340, and an Nth third shift register unit for light emission control SREM3(N) in a third light emission control circuit 230 are illustrated. The Nth third shift register unit for light emission control SREM3(N) in the third light emission control circuit 230 is coupled to a third light emission control signal line EM3L(N) corresponding to an Nth row of sub-pixels. The Nth fourth driving shift register unit SRGA4(N) in the fourth driving control circuit 340 is coupled to a fourth control signal line CS4L(N)

corresponding to the Nth row of sub-pixels. The (N−4)th third driving shift register unit SRGA3(N−4) in the third driving control circuit 330 is coupled to a first control signal line CS1L(N) corresponding to the Nth row of sub-pixels. The Nth third driving shift register unit SRGA3(N) in the third driving control circuit 330 is coupled to a second control signal line CS2L(N) corresponding to the Nth row of sub-pixels.

Figure 22:
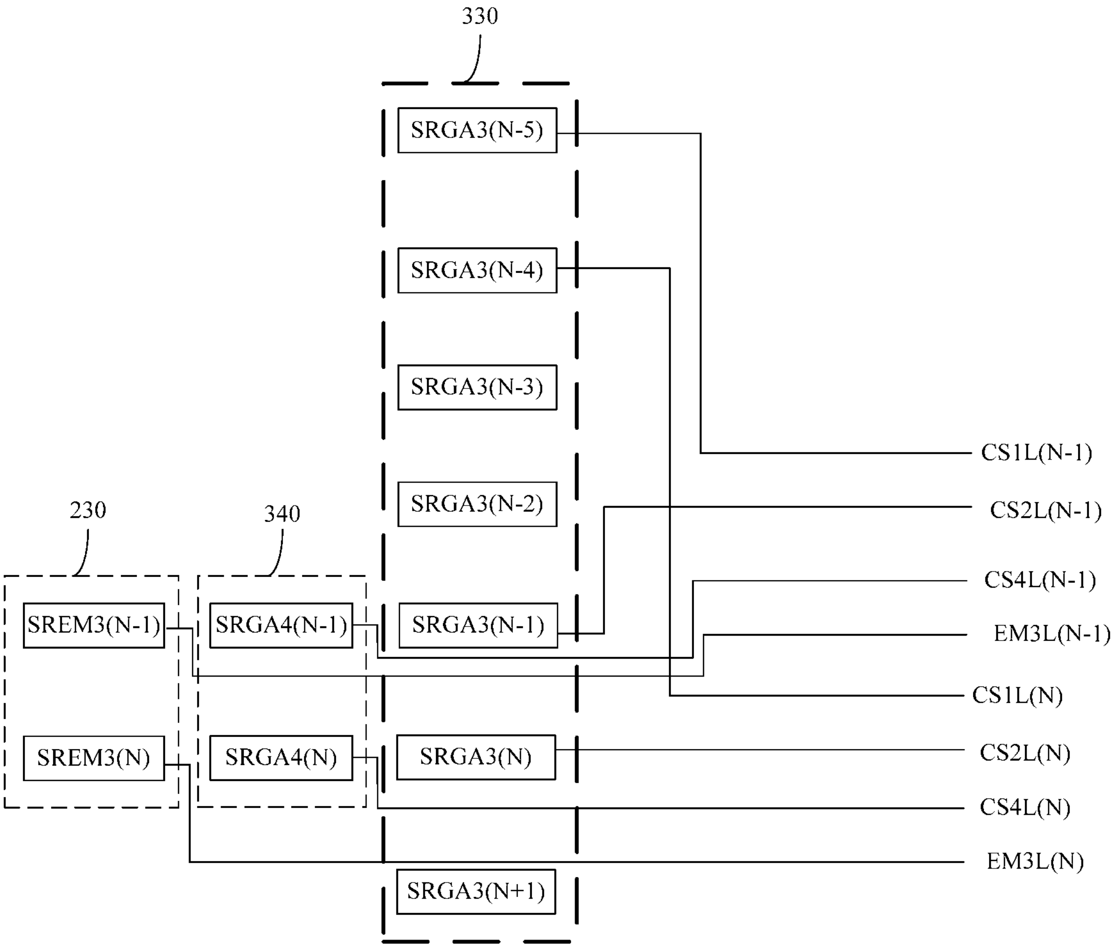
FIG. 22 shows a schematic structural diagram of a display panel according to an embodiment of the disclosure.

In some embodiments, as shown in FIG. 22, seven adjacent third driving shift register units in the third driving control circuit 330: an (N−5)th third driving shift register units SRGA3(N−3)—an (N+1)th third driving shift register units SRGA3(N+3), two fourth driving shift register units SRGA4(N−1) and SRGA4(N) in the fourth driving control circuit 340, and two third shift register units for light emission control SREM3(N−1) and SREM3(N) in the third light emission control circuit 230 are illustrated. The (N−1)th third shift register unit for light emission control SREM3 (N−1) in the third light emission control circuit 230 is coupled to the third light emission control signal line EM3L (N−1) corresponding to an (N−1)th row of sub-pixels. The Nth third shift register unit for light emission control SREM3(N) in the third light emission control circuit 230 is coupled to a third light emission control signal line EM3L (N) corresponding to an Nth row of sub-pixels. The (N−1)th fourth driving shift register unit SRGA4(N−1) in the fourth driving control circuit 340 is coupled to a fourth control signal line CS4L(N−1) corresponding to the (N−1)th row of sub-pixels. The Nth fourth driving shift register unit SRGA4 (N) in the fourth driving control circuit 340 is coupled to a fourth control signal line CS4L(N) corresponding to the Nth row of sub-pixels. In the third driving control circuit 330, an (N−5)th third driving shift register unit SRGA3(N−5) is coupled to a first control signal line CS1L(N−1) corresponding to the (N−1)th row of sub-pixels. The (N−1)th third driving shift register unit SRGA3(N−1) is coupled to a second control signal line CS2L(N−1) corresponding to the (N−1)th row of sub-pixels. The (N−4)th third driving shift register unit SRGA3(N−4) is coupled to a first control signal line CS1L(N) corresponding to the Nth row of sub-pixels. The Nth third driving shift register unit SRGA3(N) is coupled to a second control signal line CS2L(N) corresponding to the Nth row of sub-pixels.

It should be noted that seven, eight or more third driving shift register units are arranged in the third unit group. During practical application, the number of the third driving shift register units in the third unit group may be determined according to practical applications, and a correspondence relation between the third driving shift register units in the third unit group and a corresponding row of control signal lines only is required to satisfy a relation in the above timing chart.

It should be noted that, during specific implementation, in an embodiment of the disclosure, the display device may be a mobile phone, a tablet computer, a television, a monitor, a notebook computer, a digital photo frame, a navigator or other products or components with display functions. Other essential components of the display device that would be understood by those of ordinary skill in the art will not be repeated herein, and should not be regarded as a limitation to the disclosure.

Although preferred embodiments of the disclosure have been described, those skilled in the art can make additional changes and modifications to these embodiments once they learn the basic inventive concept. Therefore, the appended claims are intended to be interpreted as including preferred embodiments and all changes and modifications falling within the scope of the disclosure.

Apparently, those skilled in the art can make various modifications and variations to embodiments of the disclosure without departing from the spirit and scope of the disclosure. In this way, if these modifications and variations of embodiments of the disclosure fall within the scope of the claims of the disclosure and equivalent technologies thereof, the disclosure is further intended to include these modifications and variations.

What is claimed is:

1. A pixel circuit, comprising:

a light emitting device;

a drive transistor configured to generate, according to a data voltage, a drive current for driving the light emitting device to emit light; a data writing circuit coupled to the drive transistor; and a voltage control circuit comprising a first transistor, a second transistor and a storage capacitor;

wherein a control electrode of the first transistor is coupled to a first control signal terminal, a first electrode of the first transistor is coupled to a first initialization signal terminal, and a second electrode of the first transistor is coupled to a control electrode of the drive transistor;

a control electrode of the second transistor is coupled to a second control signal terminal, a first electrode of the second transistor is coupled to the control electrode of the drive transistor, and a second electrode of the second transistor is coupled to a second electrode of the drive transistor; and a first electrode of the storage capacitor is coupled to the control electrode of the drive transistor, and a second electrode of the storage capacitor is coupled to a first electrode of the drive transistor;

wherein the voltage control circuit is configured to, before the data voltage is input, reset the control electrode, the first electrode and the second electrode of the drive transistor in response to a signal applied to the voltage control circuit;

wherein the data writing circuit comprises a fifth transistor and a sixth transistor;

a control electrode of the fifth transistor is coupled to a fifth control signal terminal, a first electrode of the fifth transistor is coupled to the first electrode of the drive transistor and a second electrode of the fifth transistor is directly connected to a first electrode of the sixth transistor; and a control electrode of the sixth transistor is coupled to a sixth control signal terminal, and a second electrode of the sixth transistor is coupled to a data signal terminal;

wherein the data writing circuit is further configured to: in response to a fifth control signal applied to the fifth control signal terminal and a sixth control signal applied to the sixth control signal terminal, input the data voltage applied to a data signal terminal to the first electrode of the drive transistor;

wherein the data writing circuit is further configured to: in response to the fifth control signal applied to the fifth control signal terminal and the sixth control signal applied to the sixth control signal terminal, input the data voltage applied to the data signal terminal to the first electrode of the drive transistor;

wherein the second control signal, the fifth control signal, and the sixth control signal are different signals with different timing diagrams, a kickoff moment of an active level of the fifth control signal is earlier than a kickoff moment of an active level of the second control signal and the kickoff moment of the active level of the second control signal is earlier than a kickoff moment of the active level of the sixth control signal, a duration of the active level of the second control signal, a duration of the active level of the fifth control signal and a duration of the active level of the sixth control signal have overlapping time, and the overlapping time is smaller than a duration of an active level of the first control signal and the duration of the active level of the second control signal respectively;

wherein the active level of each first, second, fifth and sixth control signal is a level of control signal that, when applied to the control electrode, turns on corresponding first, second, fifth, and sixth transistor;

wherein the pixel circuit further comprises a threshold compensation circuit; and the threshold compensation circuit is coupled to the drive transistor; and the threshold compensation circuit is configured to: while the data voltage is input, compensate a threshold voltage of the drive transistor in response to a third control signal applied to a third control signal terminal;

wherein the threshold compensation circuit comprises: a third transistor; wherein a control electrode of the third transistor is coupled to the third control signal terminal, a first electrode of the third transistor is directly connected to the control electrode of the drive transistor, and a second electrode of the third transistor is directly coupled to the second electrode of the drive transistor.

2. The pixel circuit according to claim 1, wherein the voltage control circuit is further configured to: while the data voltage is input, compensate the threshold voltage of the drive transistor in response to the second control signal applied to the second control signal terminal.

3. The pixel circuit according to claim 1, wherein the data writing circuit is further configured to: in response to a fourth control signal applied to a fourth control signal terminal, input the data voltage applied to the data signal terminal to the first electrode of the drive transistor.

4. The pixel circuit according to claim 3, wherein the data writing circuit comprises a fourth transistor; wherein a control electrode of the fourth transistor is coupled to the fourth control signal terminal, a first electrode of the fourth transistor is coupled to the data signal terminal, and a second electrode of the fourth transistor is coupled to the first electrode of the drive transistor.

5. The pixel circuit according to claim 4, wherein a duration of an active level of the fourth control signal is not longer than a duration of the active level of the first control signal.

6. The pixel circuit according to claim 1, wherein at least one of the duration of the active level of of the fifth control signal and the duration of the active level of the sixth control signal is substantially the same as the duration of the active level of the second control signal.

7. The pixel circuit according to claim 1, wherein the fifth control signal terminal and the second control signal terminal are a same signal terminal.

8. The pixel circuit according to claim 1, wherein the pixel circuit further comprises:

an element reset circuit coupled to the light emitting device; wherein the element reset circuit is configured to:

in response to a seventh control signal of a seventh control signal terminal, provide a second initialization signal of a second initialization signal terminal to the light emitting device.

9. The pixel circuit according to claim 8, wherein the seventh control signal terminal and one of the first control signal terminal to the fourth control signal terminal are a same signal terminal.

10. A display panel, comprising:

a plurality of sub-pixels, wherein at least one of the plurality of sub-pixels comprises the pixel circuit of claim 1;

a plurality of control signal lines, wherein at least one of the plurality of control signal lines is coupled to the pixel circuit in a row of sub-pixels; and a drive and control circuit, wherein the drive and control circuit is coupled to the plurality of control signal lines.

11. The display panel according to claim 10, wherein the plurality of control signal lines comprise a plurality of first control signal lines, a plurality of second control signal lines, a plurality of fifth control signal lines and a plurality of sixth control signal lines; wherein one of the first control signal lines is coupled to a first control signal terminal of a pixel circuit in a row of sub-pixels;

one of the second control signal lines is coupled to a second control signal terminal of a pixel circuit in the row of sub-pixels;

one of the fifth control signal lines is coupled to a fifth control signal terminal of a pixel circuit in the row of sub-pixels; and one of the sixth control signal lines is coupled to a sixth control signal terminal of a pixel circuit in the row of sub-pixels;

the drive and control circuit comprises a first driving control circuit, and the first driving control circuit comprises a plurality of first driving shift register units sequentially arranged;

a plurality of first driving shift register units adjacent to each other serve as a first unit group, and one row of sub-pixels correspond to one first unit group; and in the first unit group;

a first one of the plurality of first driving shift register units is coupled to a first control signal line coupled to a corresponding row of sub-pixels;

a third one of the plurality of first driving shift register units is coupled to a fifth control signal line coupled to the corresponding row of sub-pixels;

a fourth one of the plurality of first driving shift register units is coupled to a second control signal line coupled to the corresponding row of sub-pixels; and a fifth one of the plurality of first driving shift register units is coupled to a sixth control signal line coupled to the corresponding row of sub-pixels.

12. The display panel according to claim 10, wherein the plurality of control signal lines comprise a plurality of first control signal lines, a plurality of second control signal lines and a plurality of sixth control signal lines;

one of the first control signal lines is coupled to a first control signal terminal of a pixel circuit in a row of sub-pixels;

one of the second control signal lines is coupled to a second control signal terminal and a fifth control signal terminal of the pixel circuit in a row of sub-pixels; and one of the sixth control signal lines is coupled to a sixth control signal terminal of a pixel circuit in the row of sub-pixels;

the drive and control circuit comprises a second driving control circuit, and the second driving control circuit comprises a plurality of second driving shift register units sequentially arranged;

a plurality of second driving shift register units adjacent to each other serve as a second unit group, and one row of sub-pixels correspond to one second unit group; and in the second unit group:

a first one of the plurality of second driving shift register units is coupled to a first control signal line coupled to a corresponding row of sub-pixels;

a third one of the plurality of second driving shift register units is coupled to a second control signal line coupled to the corresponding row of sub-pixels; and a fifth one of the plurality of second driving shift register units is coupled to a sixth control signal line coupled to the corresponding row of sub-pixels.

13. The display panel according to claim 10, wherein the plurality of control signal lines comprise plurality of first control signal lines, a plurality of second control signal lines and a plurality of fourth control signal lines;

one of the first control signal lines is coupled to a first control signal terminal of a pixel circuit in a row of sub-pixels;

one of the second control signal lines is coupled to a second control signal terminal of a pixel circuit in the row of sub-pixels; and one of the fourth control signal lines is coupled to a fourth control signal terminal of a pixel circuit in a row of sub-pixels;

the drive and control circuit comprises a third driving control circuit and a fourth driving control circuit;

the third driving control circuit comprises a plurality of third driving shift register units sequentially arranged;

a plurality of third driving shift register units adjacent to each other serve as a third unit group, and one row of sub-pixels correspond to one third unit group; in the third unit group:

a first one of the plurality of third driving shift register units is coupled to a first control signal line coupled to a corresponding row of sub-pixels; and a fifth one of the plurality of third driving shift register units is coupled to a second control signal line coupled to a corresponding row of sub-pixels;

the fourth driving control circuit comprises a plurality of fourth driving shift register units sequentially arranged; one row of sub-pixels correspond to one fourth driving shift register unit; and the fourth driving shift register unit is coupled to a fourth control signal line coupled to a corresponding row of sub-pixels.

* * * * *